US010739850B2

(12) United States Patent
Stafford et al.

(10) Patent No.: US 10,739,850 B2
(45) Date of Patent: Aug. 11, 2020

(54) PRESCRIPTION GLASSES WITH EYE GAZE TRACKING AND ELECTRO OPTICAL SIGNALING TO A HMD

(71) Applicant: Sony Interactive Entertainment Inc., Tokyo (JP)

(72) Inventors: Jeffrey Roger Stafford, Redwood City, CA (US); Christopher Norden, San Mateo, CA (US); Patrick Connor, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 133 days.

(21) Appl. No.: 15/844,455

(22) Filed: Dec. 15, 2017

(65) Prior Publication Data

US 2019/0101980 A1 Apr. 4, 2019

Related U.S. Application Data

(60) Provisional application No. 62/566,282, filed on Sep. 29, 2017.

(51) Int. Cl.
*G06F 3/01* (2006.01)
*G02C 11/00* (2006.01)
*G02B 27/01* (2006.01)
*G06F 1/3287* (2019.01)
*G06F 1/16* (2006.01)

(52) U.S. Cl.
CPC ........... *G06F 3/013* (2013.01); *G02B 27/017* (2013.01); *G02C 11/10* (2013.01); *G06F 1/3287* (2013.01); *G02B 2027/0178* (2013.01); *G02B 2027/0181* (2013.01); *G02B 2027/0185* (2013.01); *G06F 1/163* (2013.01)

(58) Field of Classification Search
CPC .... G02B 2027/0178; G02B 2027/0181; G02B 2027/0185; G02B 27/017; G02C 11/10; G06F 1/163; G06F 1/3287; G06F 3/013; H04B 5/0031
See application file for complete search history.

(56) References Cited

U.S. PATENT DOCUMENTS

2012/0306725 A1* 12/2012 Hilkes ............... G09G 5/00
345/8
2013/0127980 A1* 5/2013 Haddick ............ G06F 3/013
348/14.08
2013/0208234 A1 8/2013 Lewis
(Continued)

OTHER PUBLICATIONS

International Search Report, PCT/US2018/052746, dated Dec. 21, 2018, 3 pages.

*Primary Examiner* — Afroza Chowdhury
(74) *Attorney, Agent, or Firm* — Penilla IP, APC

(57) ABSTRACT

Systems and methods for tracking gaze information of a user includes detecting, by a sensor of a head mounted display, that a user is wearing the HMD. An encoded signal indicative of glasses being worn with the HMD, by the user, is detected by the sensor of the HMD. In response to processing the encoded signal, a gaze detection function of the HMD is disabled by the HMD. Encoded gaze data transmitted by the glasses is received by the HMD. The encoded gaze data is processed by an image frame processor and used to adjust image frames produced for rendering on a display screen of the HMD.

29 Claims, 8 Drawing Sheets

(56) References Cited

U.S. PATENT DOCUMENTS

2015/0199064 A1* 7/2015 Cho .................... G02B 27/017
                                                            345/173
2017/0123744 A1   5/2017 Park et al.
2018/0008141 A1* 1/2018 Krueger ................ A61B 5/744

* cited by examiner

PRESCRIPTION GLASSES WITH EYE GAZE TRACKING AND ELECTRO OPTICAL SIGNALING TO A HMD

CLAIM OF PRIORITY

The present application claims priority to and the benefit of the commonly owned Provisional Patent Application No. 62/566,282, with filing date of Sep. 29, 2017, and entitled "PRESCRIPTION GLASSES WITH EYE GAZE TRACKING AND ELECTRO OPTICAL SIGNALING TO A HMD," which is incorporated by reference in its entirety.

FIELD OF THE INVENTION

The present disclosure relates to detecting a user who is wearing a head mounted display is also wearing prescription glasses, and determining gaze information of the user in order to improve quality of content provided for rendering on the head mounted display.

BACKGROUND

Description of the Related Art

The advancement in computer technology has led to advancement in cloud based processing, video game technology, etc. With the advancement in cloud based processing (i.e., using high powered graphics processors, memory, and other processing and communication resources), users are presented with an interactive experience that is both desirable and optimal. For example, cloud-based systems provide unlimited processing power and system resources for execution of interactive applications, such as video games. The cloud-based systems make an overwhelming breadth of legacy and new video games available for users to access and play the video games without having to upgrade their own devices. These cloud-based systems enable streaming of content to remote clients, wherein most processing is done on servers, which may be distributed. Cloud-based interactive applications, such as gaming, therefore, has been increasing in popularity because users find it easier to access more video game titles without complex hardware restrictions, and game suppliers find it easier to manage game code from centralized locations.

At a more personal level, devices are being developed to assist the users in selecting and interacting with content that is available on a remote server of a cloud-based system or on a local device, such as a game console or local computer. For example, head mounted displays have been developed and are increasing in popularity as it allows the user to have an immersive interactive experience, such as immersive gaming experience, by allowing the user to interact with content presented on a display of the head mounted display. Similarly, various input devices, such as controllers, have been developed to assist the user in providing inputs to the interactive content. The cloud system makes it easier to introduce newer devices as majority of the processing is done at the server level and newer devices can be easily integrated at the cloud level rather than at an individual system level.

Users that need to wear prescription glasses with their head mounted display (HMD) pose an extra challenge for the eye gaze tracking systems mounted in the HMD system, as it is hard to correctly gauge the direction of their gaze and other gaze-related information. This is because prescription glasses have lenses that are in-between the eyes of the user and the HMD system and these lenses of the prescription glasses create additional aberrations to images captured by eye facing cameras or other sensors of the HMD. These aberrations include defocus (making eye gaze tracking features blurry), geometric distortion (distorting the position or shape of eye gaze tracking features), reflections (adding unwanted features that could be falsely tracked by an eye gaze tracking system), etc. Further, the prescription glasses may move around slightly while a user wearing the HMD moves their head when interacting with content rendered on the HMD. This movement causes these aberrations to be dynamic in nature, making it more difficult for eye gaze tracking systems to calibrate away these aberrations.

It is in this context that embodiments of the invention arise.

SUMMARY

Embodiments of the present invention provide systems and methods for tracking eye gaze information of a user of a head mounted display (HMD) that takes into account prescription glasses worn with the HMD, by the user. The various implementations incorporate eye tracking system within the prescription glasses of a user instead of incorporating such tracking system in the HMD. This eliminates the aberrations caused by the lens of the prescriptions glasses that are in the path of image of the eyes of the user captured by the HMD's eye tracking system. The tracked data is forwarded to the HMD so that the image frames rendered on the HMD may be adjusted.

Broadly speaking, the various implementations disclose systems and methods for tracking eye gaze information of a user who is wearing prescription glasses (simply referred to as "glasses") with the HMD. The glasses include lens and eye tracking system components, circuitry disposed in a frame. When the glasses are worn by the user, the lens and the system components of the eye tracking system of the glasses detects presence of the HMD on the user, activates the necessary components (sensors, processor, emitter, etc.,) within the glasses to capture the gaze information of the user, and transmits a wireless signal that includes the gaze information to the HMD. The HMD processes the wireless signal received from the glasses to obtain gaze data, which is forwarded to a computing device for adjusting image frames that are generated from an interactive application for rendering on a display screen of the HMD. The HMD may, in turn, engage one or more image capturing devices (e.g., cameras) to track a physical position of the glasses in relation to the HMD. The gaze data captured by the glasses and the physical position of the glasses detected by the HMD are used to determine an area the user is focusing on, and use this information to adjust content of video frames generated for rendering on the display screen of the HMD.

To assist in tracking gaze information of the user wearing the glasses, the eye tracking system of the glasses includes one or more electro optical elements (e.g., light sources), a gaze sensor, a gaze processor and an emitter. The one or more electro optical elements, such as an infrared (IR) light emitting diodes (LEDs), are disposed on the frame of the glasses and oriented to illuminate eyes of the user, when activated. The gaze sensor is configured to capture images of the eyes of the user illuminated by the electro optical elements. The gaze processor is configured to process the images captured by the gaze sensor and generate encoded gaze data. The emitter is configured to transmit the encoded gaze data as pulses of data representing gaze information of the user, to the HMD. The HMD includes a sensor (e.g., a proximity sensor) that is configured to detect the user wearing the HMD and also detect presence of the glasses worn by the user. In response to detecting the presence of the glasses worn by the user, the sensor is configured to disable gaze detection function at the HMD. The sensor is further configured to receive and process the signal emitted by the glasses, to obtain gaze information. The gaze information is processed by the HMD and/or forwarded to a computing device to adjust image frames that are forwarded to the HMD for rendering.

In the absence of the glasses on the user wearing the HMD, the sensor of the HMD enables the gaze detection function of the HMD to capture the gaze data of the user and use the captured gaze data to generate gaze information. The gaze information is forwarded to a computing device, which uses the gaze information to adjust image frames that are generated for rendering on the HMD.

In one implementation, a method is disclosed. The method includes detecting a user is wearing a head mounted display (HMD). The detection is performed by a sensor of the HMD by identifying proximity of a face of the user to the sensor of the HMD. The method further includes detecting, by the sensor of the HMD, an encoded signal that is indicative of glasses worn by the user, who is also wearing the HMD. The encoded signal is transmitted by the glasses and processed at the HMD. In response to processing the encoded signal from the glasses, a gaze detection function of the HMD is disabled. Encoded gaze data captured and transmitted by the glasses is received and processed at the HMD. The gaze data is provided to an image frame processor disposed on the HMD or on a computing device, that uses the gaze data to adjust image frames generated for rendering on a display screen of the HMD.

In some implementations, the sensor of the HMD is configured with a dual function. In a first function, the sensor is configured to determine that the user wearing the HMD is not wearing glasses and to enable gaze detection function at the HMD. In a second function, the sensor is configured to receive the encoded signal representing presence of glasses on the user who is wearing the HMD and the encoded gaze data providing gaze information of the user captured by the glasses and deactivate the gaze detection function at the HMD.

In some implementations, the encoded signal includes predefined pulses of light, wherein the pulses of light provide encoded data that is indicative of presence of the glasses.

In some implementations, the encoded data identifies a model of the glasses and functional attributes of the glasses including power level of the glasses.

In some implementations, disabling gaze detection function includes communicating with the processor to deactivate a process operated by the gaze detection function. The process, when enabled, includes activating one or more electro optical elements (e.g., light sources or light emitters, such as IR LEDs) disposed on the HMD for emitting light toward eyes of the user to enable at least one image sensor of the HMD to begin capturing images of the eyes of the user while being illuminated by the one or more electro optical elements.

In some implementations, wherein the gaze detection function includes engaging one or more infrared lights and one or more cameras on the HMD to capture images of the eyes of the user, and processing the captured images to generate gaze data for transmitting to a processor of the HMD. The processor of the HMD is configured to communicate the gaze data to a computing device.

In some implementations, the processing of images includes performing some processing by a processor of the HMD to identify gaze data received from the glasses prior to forwarding the gaze data to the computing device.

In some implementations, the processing of images includes packetizing data representing the images for transmitting to the computer for further processing to identify gaze data. The data that is packetized is raw gaze data received from the glasses.

In some implementations, the encoded gaze data is received as optical pulses, the optical pulses are triggered at a rate and frequency that is predefined. The optical pulses are used to construct coded data that embodies gaze data detected by the glasses. The optical pulses are transmitted to the sensor of the HMD for further processing by a processor of the HMD.

In some implementations, the image frame processor is executed by a computer communicatively coupled to the HMD. The computer is configured to produce frames of content for rendering on the display screen of the HMD, wherein the frames of content are modified by the image frame processor based on the gaze data transmitted by the HMD.

In some implementations, the modification of the frames of content includes adjusting the frames of content to include foveated regions that are identified based on the gaze data, wherein data for the foveated regions are produced with higher resolution relative to non-foveated regions that surround the foveated regions.

In another implementation, a system for tracking gaze information of a user, is disclosed. The system includes glasses having a pair of lens disposed in a frame. The pair of lens is configured to provide vision correction based on vision attributes of a user wearing the glasses. The glasses further includes a gaze sensor that is disposed on the frame and oriented toward eyes of the user to capture gaze data of the user. A gaze processor in the glasses is configured to generate an encoded signal that is indicative of the glasses worn by the user upon detecting the user wearing the glasses is also wearing a head mounted display (HMD), and process the gaze data captured by the gaze sensor of the glasses to generate encoded gaze data. An emitter in the glasses is configured to process the encoded signal to generate predefined pulses of data representing presence of the glasses, and the encoded gaze data representing gaze information of the user to generate pulses of data representing the gaze data. The HMD includes a sensor that is configured to detect the user wearing the HMD by determining proximity of a face of the user to the sensor of the HMD, determine if the user wearing the HMD is also wearing the glasses, and disable a gaze detection function of the HMD upon determining that the user is wearing the glasses, or to activate the gaze detection function of the HMD to capture the gaze information of the user, upon determining the user is not wearing the glasses. The HMD also includes a decoder to decrypt pulses of data provided by the emitter of the glasses to determine gaze information of the user. The HMD may include an image frame processor that is configured to process the gaze information provided in the pulses of data by the emitter or captured by the sensor of the HMD to produce image frames for rendering on a display screen of the HMD.

In some implementation, the image frame processor may be part of a separate computing device that is communicatively coupled to the HMD, which receives the gaze information and adjusts image frames generated by the computing device prior to transmitting to the HMD for rendering.

In some implementation, the image frame processor may be part of a computing device that is integrated with the HMD.

Other aspects of the invention will become apparent from the following detailed description, taken in conjunction with the accompanying drawings, illustrating by way of example the principles of embodiments of the invention.

BRIEF DESCRIPTION OF THE DRAWINGS

Various embodiments of the present invention may best be understood by reference to the following description taken in conjunction with the accompanying drawings in which.

DETAILED DESCRIPTION

Figure 1:
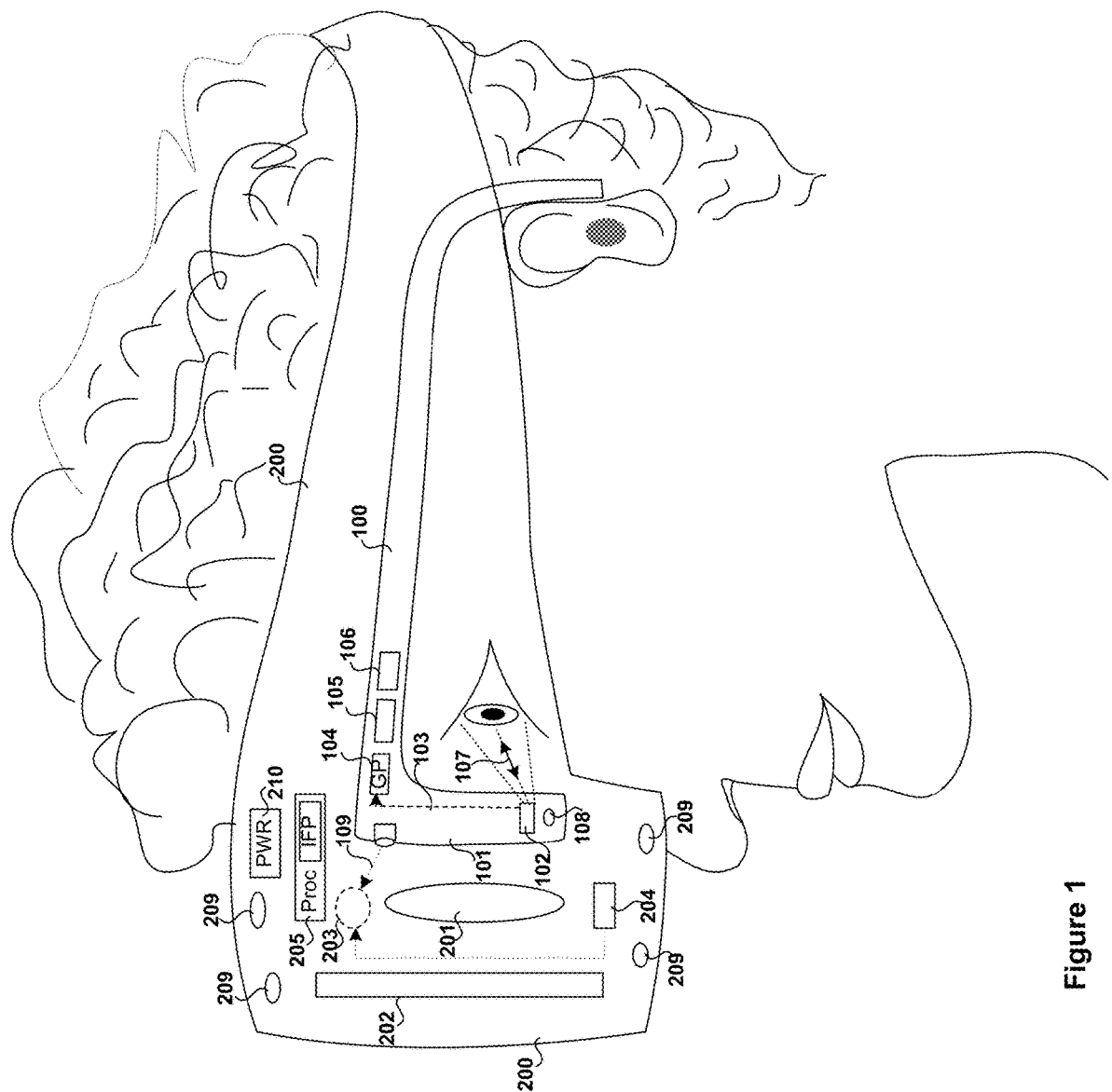
FIG. 1 illustrates a simplified view of a user wearing glasses and a head mounted display, in accordance with some embodiments of the present invention.

Systems and methods for capturing gaze data of a user wearing prescription glasses along with a head mounted display (HMD), are described. The system uses various sensors disposed within the glasses and the HMD to detect that the user wearing the glasses is also wearing the HMD. In response, the HMD activates certain ones of the sensors and disables certain other sensors on the HMD and the glasses in order to capture gaze information of the user. The gaze information of the user is provided to a computing device, which uses the gaze information to modify image frames that are being generated for rendering on a display screen of the HMD.

Typically, the eye tracking systems are mounted in the HMD to enable the HMD to capture gaze data of a user wearing the HMD. Generally, such eye tracking system functions well when no intervening lenses (i.e., optics) are present. However, users wearing prescription glasses (or simply "glasses") provide an extra challenge for the eye tracking systems mounted in the HMD as the lens of the glasses create aberrations to images captured by image sensors, such as cameras, of the eye tracking systems. As the user wearing the glasses and the HMD moves around while interacting with content rendered on the HMD, the glasses may shift in position making the aberrations to images more dynamic in nature.

In order to avoid such aberrations in images of the eyes of the user captured by the eye tracking system of the HMD, the eye tracking system is shifted away from the HMD and on to the prescription glasses that are closer to the eye of the user than the HMD. This shift eliminates the aberrations to images as it removes the intervening lens from the image path of the eye tracking system. A signaling mechanism is also provided in the glasses to signal results (e.g., relative positions of the eye pupil and/or angles of the eye gaze) of the eye tracking system. One example signaling mechanism used is a simple electro optical emitter (e.g., light source), such as an infrared (IR) light emitting diode (LED), that is placed in the frame of the glasses. In some implementations, the IR LEDs disposed on the frame can act as both an illuminator and an emitter. In other implementations, a first set of IR LEDs are provided to illuminate the eyes of the user and a second set of IR LEDs act as emitters to transmit the time based flashes. In some implementations, the second set of IR LEDs may act as both emitters and indicators due to their orientation (i.e., facing outward). As an indicator, the second set of IR LEDs are used to track the glasses by an image capturing devices (e.g., cameras) of the HMD, and as an emitter the second set of IR LEDs would transmit the data captured or generated at the glasses. In alternate implementations, the IR LEDs may act as an illuminator, an indicator and an emitter.

In some implementations, the eye tracking data captured by an image capturing device (e.g., camera) can be processed by a gaze processor in the glasses. As part of processing, the gaze processor encodes the gaze data to generate a series of time based flashes that is then transmitted by the IR LED to the HMD. The encoded signals can then be decoded by a decoder of the HMD to obtain information related to the gaze data. In some implementations, the decoder of the HMD may be a simple IR photo diode or a transceiver on the HMD.

In some implementation, a sensor on the HMD is used to detect proximity of a user's face to the sensor to determine if the user is wearing the HMD. In some implementation, this sensor could be an IR based proximity sensor. The sensor, such as a proximity sensor may be configured to operate in dual functional modes. In the first functional mode, the sensor activates a glasses tracking mode, wherein the sensor is configured to detect that a user wearing the HMD is also wearing the glasses. In the second functional mode, the sensor activates a gaze tracking mode, wherein the sensor is configured to activate a gaze detection function to detect gaze information by capturing images of the eyes of the user. In the first mode, in response to detecting the user wearing both the glasses and the HMD, the sensor of the HMD disables the gaze detection function at the HMD by deactivating the optical emitters (e.g., signal emitted by the IR LEDs) of the HMD that are oriented to illuminate the eyes of the user. In this mode, the sensor is configured to receive the encoded signals transmitted by an emitter on the glasses, and decrypt the encoded signals to determine presence of the glasses on the user. In response to the signal that is indicative of the presence of the glasses on the user wearing the HMD, the sensor of the HMD activates the glasses tracking function, wherein the sensor sends a signal to the image capturing device of the HMD to track the position of the glasses on the user.

As part of the glasses tracking function, the sensor of the HMD sends a signal to activate frame position emitters (e.g., IR LEDs) disposed on the glasses and signals the image capturing device at the HMD to track the frame position emitters that are disposed on the frame of the glasses. The frame position emitters are tracked to determine physical position of the glasses in relation to the HMD. The physical position data of the glasses may be used to compute an offset of the glasses to the HMD, which, in turn, may be used to calculate relative position of the pupils of the eyes and/or eye gaze direction with respect to axis of the optics of the HMD through which the user views the virtual images rendered on a display screen.

In the second mode, the sensor enables the gaze detection function of the HMD by activating the electro optical elements (e.g., IR LEDs) on the HMD that are directed toward the eyes of the user, and signaling the camera of the HMD to track the gaze of the user by capturing images of the user's eyes illuminated by the light from the activated electro optical elements (e.g., light source). In this mode, there is no need to activate glasses tracking function at the HMD as the user is not wearing any glasses.

In some implementations, the sensor may be configured to receive other near field signals emitted by other emitting devices instead of the flashes from the IR LEDs distributed on the glasses and such signals may be wireless signals that are proprietary or non-proprietary in nature.

In some implementations, the gaze tracking system of the glasses may be configured to transmit the signal representing the gaze tracking results to other computing devices (e.g., laptop computer, desktop computer, tablet computer, cellular phone device, etc.) instead of or in addition to the sensor of the HMD, using wireless communication (either proprietary or non-proprietary) and allow the appropriate computing device to decode the gaze tracking results. In the case wherein the gaze tracking results are transmitted to the laptop or cellular phone device, the cameras provided in the computing device (e.g., RGB camera in the laptop or cellular phone device that is facing the user) may be used to detect the user and track the glasses frame. In other implementations, the signal with the eye tracking results may be transmitted to other computing devices through the HMD, for decoding and processing.

The various sensors built into the HMD and the glasses are activated to detect the presence of the user wearing the HMD and the glasses, and to capture images of the user's eyes to determine gaze data that is free of any aberrations. The gaze data are used to identify gaze attributes that are used to adjust image frames generated by a computing device that is communicatively coupled to the HMD. In some implementations, the image frames are adjusted to provide foveate rendering, wherein specific portions of the images corresponding to the gaze direction are provided with high resolution while remaining portions of the images outside of the specific portions but within the field of view, are rendered at low resolution. This type of rendering results in optimizing processing and communication resources of the HMD and the computing device as it reduces the amount of image content (i.e., less in the non-foveate region and more in the foveate region) that is being processed and transmitted in image frames to the HMD for rendering, without compromising on the quality of the images.

It should be noted that various embodiments described in the present disclosure may be practiced without some or all of these specific details. In other instances, well known process operations or hardware components have not been described in detail in order not to unnecessarily obscure various embodiments described in the present disclosure.

FIG. 1 illustrates an example of a user wearing both prescription glasses 100 and a head mounted display (HMD) 200, in one implementation. The prescription glasses (or simply "glasses") 100 includes a frame 101 on which a pair of lens are disposed. The pair of lens is configured to compensate for optical characteristic deficiencies in the user's vision. In addition to the lens, the frame 101 of the glasses 100 includes at least one sensor (not shown) that is configured to capture data indicative of the user wearing the glasses. The sensor may detect the user wearing the glasses based on the proximity of the user's face to the sensor. A processor 105 of the glasses 100 is configured to receive and process the data from the sensor to generate a predefined signal indicative of the presence of the glasses on the user.

In some implementations, a second set of sensors may be disposed on the frame of the glasses and used to detect presence of a HMD 200 on the user wearing the glasses. In alternate implementations, instead of using the sensors on the glasses to detect presence of the HMD, a sensor on the HMD may transmit a signal to the processor 105 of the glasses 100 to indicate the presence of the HMD on the user who is also wearing the glasses 100. The processor 105 of the glasses receives information regarding the presence of the HMD 200 on the user (either from the sensors of the glasses or the sensor of the HMD) and activates an image capturing device 102, such as a camera, to capture images 107 of the eyes of the user. The images 107 captured by the image capturing device 102 are processed by the processor 105 to generate a signal that provides information related to gaze data of the user. The gaze data signal and the signal indicative of the presence of the glasses are forwarded to a gaze processor 104 available in the glasses 100 for encoding. The gaze processor 104 is configured to encode the signal indicative of the presence of glasses to generate predefined optical pulses, and the gaze data to generate optical pulses that define gaze data.

A power module 106 is coupled to the gaze processor 104 and to the processor 105, and is configured to provide power to the respective components. The glasses 100 further includes one or more emitters 103 that are configured to receive the encoded signal and the encoded gaze data from the gaze processor 104 and to transmit the encoded signal and encoded gaze data to the HMD 200 as time-based flashes 109.

The HMD 200 is a display device, worn on a head of a user or as part of a helmet. The HMD 200 includes a display screen 202 for rendering content. Content (audio, video and/or haptic content) for rendering on the HMD 200 may be provided by a computer (not shown) that is communicatively connected to the HMD 200 through wired or wireless connections. In addition to the display screen 202, the HMD 200 may include a single optic 201 disposed in front of the eyes of the user or a small optic 201 that is disposed in front of each eye of the user. The display screen 202 is configured to render image frames of content provided by the computer (not shown) that can be viewed through the optic 201. The optic 201 (e.g., lens) is used to map the display screen that is disposed close to the user's eyes in to a wide field of view. To this effect, the optic(s) provided in the HMD are designed to provide a distant point of focus for the image content rendered on the display screen 202 so as to enable the user to view the image content clearly. In some implementation, the distant point of focus is defined to be at infinity. In other implementations, the distant point of focus may be any other distance that would allow the eyes of the user to clearly view the image content rendered on the display screen 202 of the HMD 200. The optic 201 is disposed on the HMD 200 closer to the eyes of the user and the display screen 202 is disposed behind the optic 201 so that the optic 201 is between the display screen 202 and the eyes of the user.

In some implementation, the HMD 200 may be a virtual reality (VR) device, wherein the display screen 202 is designed to block light from the external environment from entering, so as to provide a more immersive experience to the user of the HMD 200. The display screen 202 is configured to render image frames of content generated by a computing device executing an interactive application. In some implementations, when a safety condition is detected in the real-world environment in which the user is operating, an image of the real-world environment in the vicinity of the user may be captured by an outward facing camera of the HMD or from an external camera communicatively connected to the HMD and presented on a portion of the display screen of the HMD, while remaining portion of the display screen continues to render the image frames of content. Such selective presentation of different content on the display screen 202 makes it appear that portions of the display screen 202 are operating in a transparent mode.

In some implementations, a shutter screen (not shown) may be provided behind the display screen 202 to block the light from the external environment from entering when the user is viewing the image content provided by the computer. In such implementations, the display screen is a transparent screen and the shutter screen provides sufficient contrast to allow viewing of content rendered on the display screen. The shutter screen may be designed such that the entire shutter screen or selective portions of the shutter screen may be switched from an opaque mode to a transparent mode. For example, selective portions of the shutter screen may be switched from an opaque (i.e., non-transparent) mode to a transparent mode to allow the user to view the real-world environment through the selective portions while remaining portions of the shutter screen are maintained in the opaque mode to enable the user to view the images of content rendered on the corresponding portions of the display screen. In some implementations, additional optics may be provided behind the shutter screen, so that when portions of the shutter screen are switched to transparent mode, the additional optics may be used for viewing the real-world environment in the portions of the shutter screen that are switched to transparent mode. The additional optics are configured to correct any image distortions that could be caused by the near-eye optics 201 that are disposed in between the user's eyes and the display screen 202 of the HMD 200. For more details of the HMD with a shutter screen and additional optics, reference can be made to U.S. application Ser. No. 14/338,326, filed on Jul. 22, 2014, and entitled "Virtual Reality Headset with See-Through Mode," and for more details related to transitioning portions of display screen from a non-transparent mode to transparent mode and vice versa, reference can be made to application Ser. No. 14/254,881, filed on Apr. 16, 2014, and entitled, "Systems and Methods for Transitioning between Transparent Mode and Non-Transparent Mode in a Head Mounted Display," which are incorporated herein by reference in their entirety.

A sensor 203, such as a proximity sensor, on the HMD 200 receives the signal emitted by the emitter 103 of the glasses and either processes the signal locally or forwards it to a processor 205 of the HMD for further processing. The sensor 203 may be disposed on an outer surface of the frame of the HMD or inside the HMD. Additional data captured by the sensor 203 are also forwarded to the processor 205 for further processing. The processor 205 of the HMD is configured to process the data captured by various sensors (e.g., proximity sensor) of the HMD 200, receive and process the encoded signal and encoded gaze data transmitted by the emitters 103 of the glasses 100, and generate data that represents gaze information of the user. The data representing the gaze information is used to adjust the image frames of content provided by a computer that is communicatively coupled to the HMD 200. The sensor 203 processes the predefined signals emitted by the emitter 103 that is indicative of the presence of the glasses on the user wearing the HMD 200. In response to detecting the user wearing the glasses with the HMD, the sensor 203 activates glasses tracking function by sending a signal to the glasses 100 to activate one or more IR LEDs disposed on the frame, a signal to the processor 205 to deactivate one or more light sources 209 on the HMD, and a signal to one or more image capturing devices 204 of the HMD 200 to track the glasses 100 in order to determine relative physical position of the glasses 100 with respect to the HMD 200. In some implementations, the image capturing device(s) may be disposed outside of the HMD 200 but communicatively coupled to the HMD 200, and the sensor 203 of the HMD is configured to generate a signal to the image capturing device(s) to track the physical position of the glasses. The images captured by the image capturing device 204 of the HMD 200 are used to compute the offset of the glasses 100 in relation to the HMD 200. The computed offset and the gaze data are used to adjust image frames provided to the HMD 200 for rendering.

When the sensor 203 of the HMD 200 detects the user not wearing any glasses, the sensor 203 enables the gaze detection function of the HMD 200. The gaze detection function executes a process of activating the light sources 209 of the HMD to illuminate the eyes of the user, and signaling the image capturing device 204 of the HMD 200 to capture images of the eyes of the user illuminated by the light sources 209. The captured images are used to determine gaze data, which is forwarded to a computer to adjust image frames provided to the HMD 100 for rendering.

Figure 2:
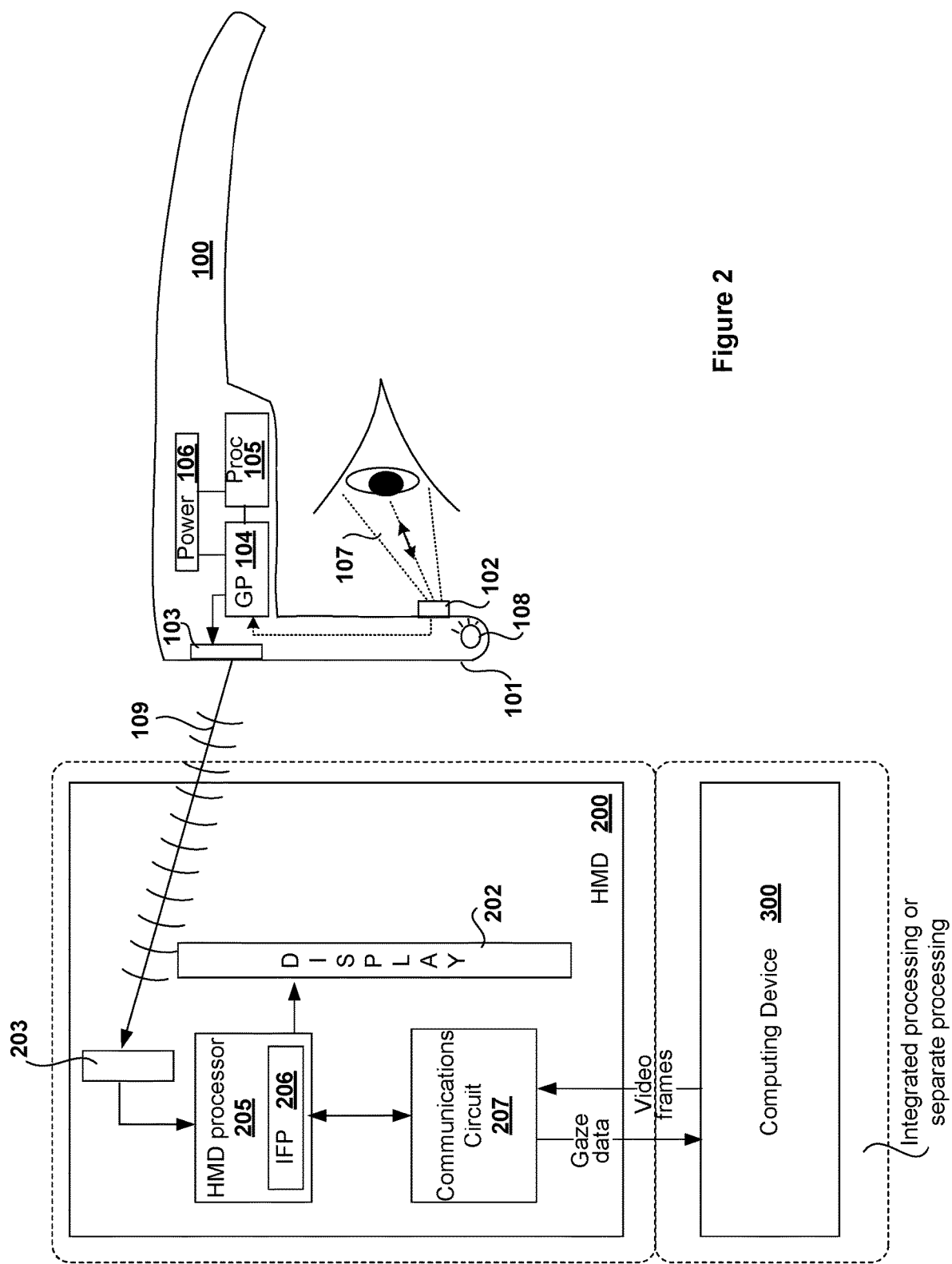
FIG. 2 illustrates various components of the glasses and the HMD used in capturing gaze direction of a user wearing the glasses and the HMD and providing gaze data to a computing device for adjusting image frames provided to the HMD, in accordance with one embodiment of the invention.
Figure 3:
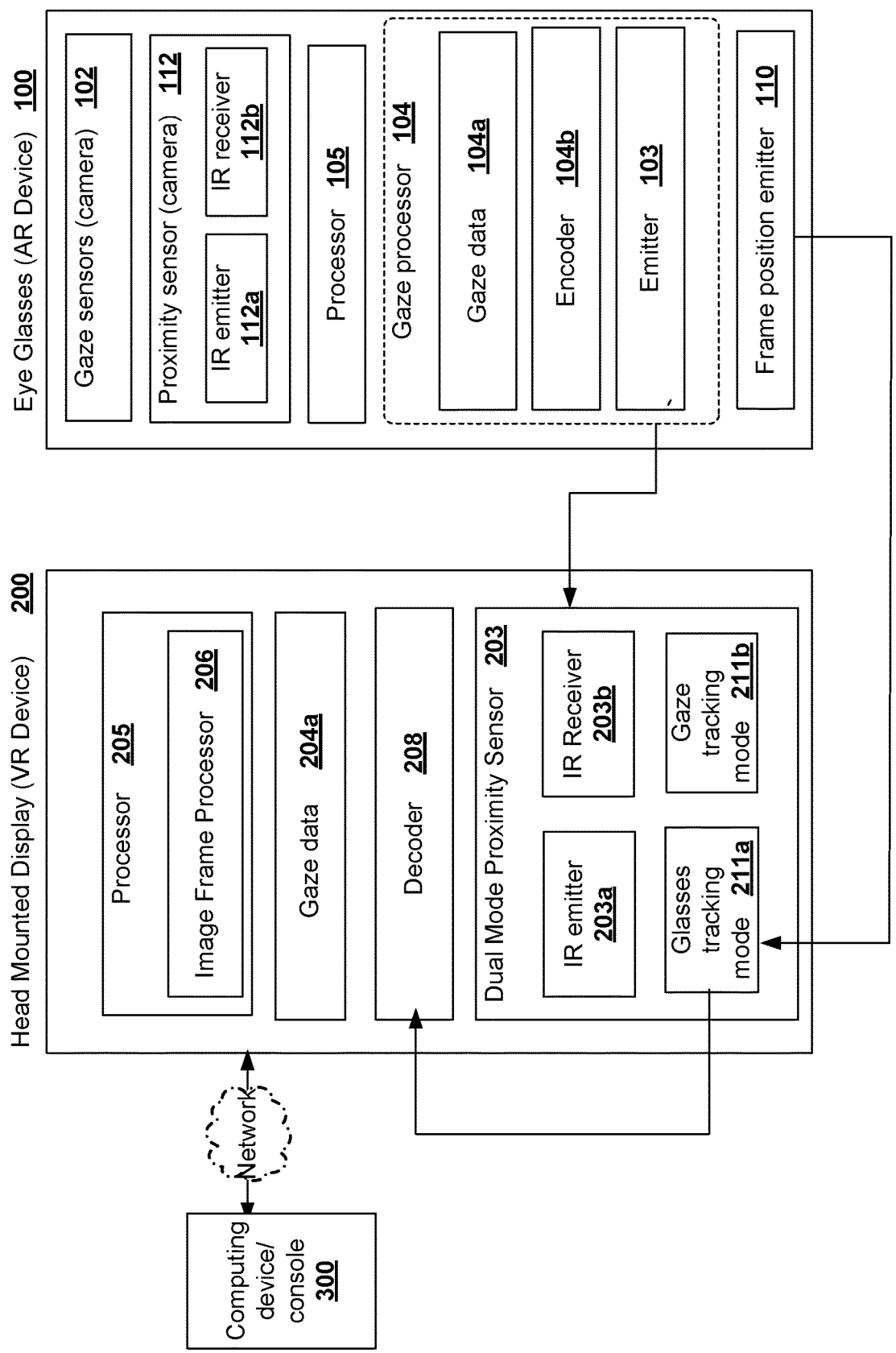
FIG. 3 illustrates a simplified flow of data through various components of the glasses, the HMD and the computing device, in accordance with an embodiment of the invention.

FIG. 2 illustrates a simplified block diagram of a system that is used to identify various data obtained from different sensors disposed on prescription glasses 100 and a HMD 200 worn by the user and to analyze the data to determine gaze direction of the user wearing both prescription glasses 100 and the HMD 200, in one implementation. FIG. 3 illustrates the various modules within the glasses 100 and the HMD 200 that are used to adjust image frames generated by executing an interactive application at a computing device, in accordance to the gaze direction of a user wearing the glasses 100 and the HMD 200, in one implementation. Referring simultaneously to FIGS. 2 and 3, the glasses 100 includes a frame 101 on which a pair of lens are disposed. The lens are configured to compensate for optical characteristic deficiencies in a user's vision. An image capturing device 102, such as a camera, is disposed on the frame of the glasses and is oriented toward the eyes of the user to capture images of the user. One or more light sources or light emitters 108, such as infra red light emitting diodes (IR LEDs), are disposed on the frame and directed toward the eyes of the user to illuminate the user's eyes so that the image capturing device 102 can capture image of the gaze 107 of the user.

In one implementation, the processor 105 of the glasses first determines if the user is wearing the glasses, and upon confirming the user wearing glasses, determine if the user is also wearing HMD 200 for viewing content rendered thereon. The processor 105 uses a proximity sensor 112 of the glasses 100 for determining the user wearing glasses. In one implementation, the proximity sensor 112 on the glasses 100 includes an IR emitter 112a and an IR receiver 112b. The IR emitter 112a may emit a light signal toward the face of the user and the IR receiver 112b receives the light signal reflected back from the face. The light signals from the IR emitter 112a and the IR receiver 112b are used by the processor 105 to determine a distance between the face of the user and the sensor, and use this proximity data to determine if the user is wearing the glasses 100. Based on the determination, the processor 105 generates a signal indicative of the user wearing the glasses 100. Using the proximity sensor 112 is one way of determining the user wearing glasses and that other ways of determining the user wearing the glasses may also be contemplated including use of external cameras to capture image of the user and processing the image, etc.

The processor 105 is further configured to identify attributes of the glasses 100 and of the user associated with the glasses 100. Some of the attributes that may be identified by the processor 105 include an identifier of the user wearing the glasses, a model number and model description of the glasses, current power level of the lens, etc. The lens are designed to compensate for deficiencies in the optical characteristics of the eyes of a user. For example, the lens of the glasses are used to treat myopia (near-sightedness), hyperopia (far-sightedness), astigmatism, presbyopia, etc. The attributes and signal data are forwarded by the processor 105 to a gaze processor 104 in the glasses 100 for encoding. The gaze processor 104 is configured to process the signal data from the processor 105 to generate an encoded signal. In some implementation, the encoded signal generated by the gaze processor 104 may be in the form of predefined optical pulses that are indicative of the presence of the glasses.

In some implementation, the processor 105 of the glasses 100 is configured to detect presence of the HMD 200 on the user wearing the glasses 100. The presence of the HMD 200 may be detected based on a signal transmitted by a processor 205 or a sensor of the HMD 200. For example, a sensor 203, such as a proximity sensor, in the HMD 200 may detect the user wearing the HMD 200 by determining proximity of the user's face to the sensor 203. Similar to the IR emitter 112a and IR receiver 112b available in the proximity sensor 112 of the glasses 100, the proximity sensor 203 may include an IR emitter 203a and an IR receiver 203b for detecting the proximity of the user's face and forwards this information to the processor 205 of the HMD 200. Based on the light signals from the IR emitter 203a and the IR receiver 203b, the distance of the user's face from the sensor is determined. When the distance of the user's face is within a predefined range, the proximity sensor 203 determines the user is wearing the HMD 200. The distance and other information related to the presence of the user wearing the HMD 200 is processed by the proximity sensor 203 or is forwarded to the processor 205. A signal indicating the user wearing the HMD 200 is generated and transmitted by the sensor 203 or by the processor 205 of the HMD 200 to the gaze processor 104 of the glasses 100.

Similarly, the proximity sensor 112 of the glasses 100 may detect the presence of the HMD 200 on the user wearing the glasses 100 using the light signals from the IR emitter and IR receiver. Proximity data is one way of determining the user is wearing the glasses is also wearing the HMD, and that other means may also be employed. Upon detecting the presence of the HMD 200, the emitter 103 of the glasses emits the encoded signal in the form of time-based pulses to the HMD 200 to indicate the presence of the glasses 100 on the user.

The proximity sensor 203 receives the encoded signals from the emitter 103 of the glasses 100 and in response transmits a disable signal to the processor 205 to disable the gaze detection function at the HMD 200. The disable signal to the HMD 200 is interpreted by the processor 205 to begin a process of deactivating one or more light sources on the HMD that are configured to illuminate the eyes of the user. Deactivating the light sources on the HMD 200 that are directed toward the user's eyes would cause the user's eyes not getting illuminated, thereby preventing the gaze of the user from being captured by the image capturing device of the HMD. Additionally, the proximity sensor 203 enables a glasses tracking function 211a at the HMD 200. In the glasses tracking function, the proximity sensor sends an activation signal to the glasses 100 to activate one or more frame position emitters 110 on the frame 101 of the glasses 100 and a signal to the image capturing device of the HMD 200 to capture images of the activated frame position emitters 110 disposed on the glasses 100. These frame position emitters 110 are oriented to face outward so that the image capturing device of the HMD 200 can track the physical position of the glasses based on the light emitted by the frame position emitters 110. The captured data may be used by the processor 205 of the HMD to compute an offset of the glasses in relation to the eyes of the user, which are used for adjusting image frames of content that is being rendered on the display screen 202.

In addition to activating the one or more frame position emitters 110 on the glasses 100, the proximity sensor 203 may send a signal to the processor 105 of the glasses 100 to enable a gaze tracking function at the glasses 100. Alternately, the processor 105 of the glasses 100 may activate the gaze tracking function at the glasses 100 upon detecting the presence of the HMD 200 on the user wearing the glasses 100. The gaze tracking function executes a process of activating one or more light sources (e.g., IR LEDs) 108 located on the frame 101 of the glasses 100 and oriented inward to illuminate the eyes of the user, and to activate a gaze sensor (i.e., a gaze camera or simply a camera) 102 to capture images of the user's gaze 107. These captured images of the user's gaze 107 are forwarded by the gaze camera 102 to the gaze processor 104. The gaze processor 104, using input from the processor 105, processes the images of the user's gaze 107 and generates light pulses defining gaze data 104a. These light pulses are encoded by an encoder 104b (either proprietary or non-proprietary) and forwarded to the emitter 103. The emitter 103 then communicates the encoded gaze data 104a to the HMD 200 as additional light pulses. The additional light pulses including gaze data are transmitted to the sensor 203 of the HMD 200 as time-based light pulses 109 using wireless communication (i.e., wireless signal that is in the form of optical pulse signal). In some implementation, the time-based light pulses are transmitted to the HMD 200 at a rate and frequency that is predefined. The predefined rate and frequency of the light pulses may be used to construct data that embodies the gaze data. For example, different rate and/or frequency may be used to identify the direction of the user's gaze or different gaze attributes.

In yet another implementation, upon the proximity sensor 203 processing the encoded signals from the emitter 103 of the glasses, the sensor 203 or the processor 205 of the HMD 200 may activate the gaze detection function of the HMD. In this implementation, the HMD is aware of the optical properties of the glasses worn by the user. The optical properties of the glasses are taken into consideration when processing images of the user's gaze captured by the camera of the HMD.

In alternate implementations, upon the proximity sensor 203 processing the encoded signals from the emitter 103 of the glasses 100, either the proximity sensor 203 or the processor 205 of the HMD 200 may send a signal to the glasses 100 to disable the gaze tracking function of the glasses. In this implementation, the signal to the glasses 100 may include a command to turn off or deactivate the gaze tracking camera (i.e., image capturing device or any other sensor capable of tracking the position and gaze of the user) of the glasses and to keep the IR LEDs of the glasses 100 on, so that the eyes of the user may be illuminated from the IR lights of the glasses. As the camera is not activated in the glasses, no gaze data is sent from the glasses to the HMD. Instead, the proximity sensor 203 or the processor 205 of the HMD 200 may enable the gaze tracking function on the HMD. Enabling the gaze tracking function of the HMD includes activating the HMD's own image capturing device to capture the gaze data of the user while disabling the IR lights of the HMD. This way of capturing the gaze data of the user using the camera of the HMD and the lights of the glasses may be implemented to take advantage of improved gaze tracking camera available on the HMD while preventing the IR lights of the HMD from reflecting off the user's prescription glasses 100.

In further implementation, upon processing the encoded signals from the glasses 100, the processor 205 or the proximity sensor 203 of the HMD may send a signal to activate the gaze tracking function in both the glasses 100 and the HMD 200. In such implementations, only the IR light of the glasses are activated to illuminate the eyes of the user while the IR light of the HMD are deactivated. This is to prevent the IR lights of the HMD from reflecting off the user's prescription glasses 100. The cameras of both the glasses and the HMD are activated to capture images of the user's gaze. Directing the cameras of both the HMD and the glasses may lead to improved eye tracking, as the images captured by the camera of the HMD may be verified against the images captured by the camera of the glasses. The images captured by the camera of the HMD are processed by taking into consideration the optical properties of the lens of the glasses through which the images of the user's gaze are captured by the camera of the HMD.

The gaze processor 104 and the processor 105 of the glasses are connected to a power circuitry 106 to receive power. In some implementations, the gaze processor 104 may be part of the processor 105 and in other implementations, the gaze processor 104 is separate from the processor 105 but communicates with the processor 105 through an internal data bus (not shown).

It should be noted that the function of only select ones of the components of the HMD 200 are described herein in order not to obscure the various embodiments. The HMD 200 includes various circuitry and components that are used to provide power, detect different movement of the HMD 200, receive and interpret input, detect and generate various signals, capture images related to the user and the real-world environment, and communicate with other devices both inside and outside the HMD 200. Similarly, it should be noted that only select ones of the components of the glasses 100 are described herein in order not to obscure the various embodiments. The glasses includes various circuitry and components that are used to detect and generate various signals, capture data related to the user and the real-world environment, etc.

Continuing to refer to FIGS. 2 and 3, the sensor 203 of the HMD 200, upon receiving the encoded signal and the encoded gaze data from the glasses, may perform some level of data authentication by verifying that the data is coming from a device that is coupled to the HMD. Upon successful verification, the encoded gaze data is forwarded to a decoder 208 for decrypting. The decoder 208 decrypts the encoded signal and the encoded gaze data to generate the gaze data 204a.

The sensor 203 then forwards the gaze data 204a and the captured images defining the physical position of the glasses to the processor 205 for processing or for packetizing for onward transmission to a computing device. In some implementations, the gaze data 204a decrypted by the decoder 208 may be fully processed or partially processed by the processor 205 of the HMD 200 before communicating it to a computing device 300 through a communications circuit 207. In the implementations where the processor 205 of the HMD 200 fully processes the gaze data and the data identifying the physical position of the glasses, the processor 205 uses an image frame processor 206 to adjust content of the image frames that are provided by the computing device 300 for rendering on the display screen of the HMD. The adjusted image frames are forwarded to the display screen 202 of the HMD 200 for rendering. In the implementations wherein the gaze data is partially processed by the processor 205 of the HMD or not processed, the pre-processed gaze data or the raw gaze data (i.e., unprocessed gaze data) is packetized in accordance to the communication protocol used by the communications circuit 207 and transmitted to the computing device through the communications circuit 207. The computing device 300 interprets the data provided in the packets to adjust image frames of content generated for an interactive application. In some implementations, the computing device 300 may employ an image frame processor (not shown) to adjust images frames generated by the computing device 300 based on the gaze data and the physical position of the glasses transmitted by the HMD. The adjusted image frames are provided to the HMD for rendering on a display screen of the HMD 200.

The image frame processor 206 may be part of the HMD 200 or may be part of the computing device 300 and may be used in adjusting the image frames generated by an interactive application executing on the computing device 300. In some implementations, the computing device 300 may be integrated within the HMD 200. In alternate implementations, the computing device 300 may be a separate processing device. In some other implementations, the computing device may be a server computer that is part of a cloud network and the communications circuit 207 of the HMD 200 is configured to forward the processed, pre-processed or unprocessed gaze data through a router (not shown) and a network, such as the Internet (not shown). The computing device 300 uses the gaze data to adjust the image frames generated by an interactive application, such as a video game, executing on the computing device 300.

The computing device 300 (also referred to as "computer") forwards the adjusted image frames as encoded signals, back to the processor 205 of the HMD 200 through the communications circuit 207. The processor 205 or the image frame processor 206 within the processor 205 decodes the encoded signals to obtain the adjusted image frames, which are forwarded to the display screen 202 of the HMD 200 for rendering. The adjusted image frames rendered on the display screen of the HMD 200 are viewed through the optics 201 of the HMD 200 and the lens of the glasses 100.

In one implementation, the computing device adjusts the data representing the image frames, generated by an interactive application, using foveated imaging technique. In the foveated imaging technique, the resolution (i.e., amount of detail) of the images is varied across the image frame based on the point of focus, which can be determined from the gaze data. The point of focus captured in the user's gaze (i.e., a point of the gaze that corresponds with the center of a user's retina, the fovea) is used to identify a region in the image frame where more data has to be provided to obtain maximum resolution of the image (i.e., the foveate region). The remaining portion of the image frame that either surrounds or is outside the foveate region, is the non-foveate region. The computing device analyzes the user's gaze data to identify the focus point of the user's gaze and adjusts the image frames accordingly so that more data is included for the foveate region representing the focus point and less data in the non-foveate region. Adjusting the amount of data transmitted to the HMD for rendering using this technique saves network and processing resources as less data is included in the image frames (for the non-foveated region), while providing high quality of content to the HMD. Foveate rendering technique is one way of adjusting data sent to the HMD and that other ways of adjusting the data may be contemplated.

In the case when no glasses 100 are detected on the user who is wearing the HMD 200, the sensor 203 of the HMD 200 deactivates the glasses tracking mode 211a and instead activates a gaze tracking mode 211b. In this case, there is no need to send a signal to disable gaze detection function on the glasses as there is not glasses present on the user wearing the HMD 200. In the gaze tracking mode 211b, the sensor 203 activates one or more light emitters 209 disposed on the HMD 200 and oriented to illuminate the eyes of the user, when the HMD is worn by the user. The one or more light emitters 209 may be disposed on an inside surface of the frame of the HMD or may be disposed in the HMD and directed toward eyes of the user. The sensor 203 then signals an image capturing device (e.g., camera, such as IR camera or depth camera) of the HMD 200 to capture images of the eyes of the user illuminated by the light emitters 209 of the HMD 200. It should be noted that the various references to light sources, light emitters, optical light sources or optical light emitters, as used in this application, refer to a light source, such as an IR LED, that is capable of illuminating an object (e.g., user's eyes), when activated.

Similar to the embodiment where the user is wearing glasses, the images captured by the image capturing device of the HMD 200 are forwarded by the sensor 203 to the processor 205 for processing and for onward transmission to the computing device 300. In some implementation, the processor 205 may perform some processing of the images before forwarding the partially processed image data to the computing device using the communications circuit 207. The computing device 300 may receive the data forwarded by the processor 205, interpret the gaze data information contained therein, and adjust the image frames generated by an interactive application executing at the computing device 300. The computing device forwards the adjusted image frames to an image frame processor 206 of the HMD for interpretation prior to rendering the image frames on the display screen of the HMD 200.

The various embodiments describe a system that employs an augmented reality (AR) device (e.g., glasses) in conjunction with a virtual reality (VR) device (e.g., HMD) to capture gaze data of a user wearing both the AR device and the VR device. The gaze data is processed at the computing device to determine foveate region and non-foveated region, and adjust frames of content generated by an interactive application, such as a video game, accordingly. The communications circuit 207 used for communication between the HMD and the computing device may employ near-field communication, or Transfer Jet® protocol or any other wired or wireless communications protocol that are proprietary or non-proprietary. The communication between the eyeglasses and the HMD may employ wireless protocol.

FIGS. 4A-4E illustrate various orientations of light emitters and cameras or other image capturing devices that are disposed on the HMD 200 for capturing the physical position of the eyeglasses, when the glasses are present on the user wearing the HMD 200, or for capturing the gaze data of the user, when the user wearing the HMD is not wearing the glasses. The HMD 200 includes optics 201 (e.g., lens), a display screen (not shown), a sensor 203 (e.g., proximity sensor) light emitters (or light sources) 209 and image capturing device(s) (e.g., cameras) 204. The optics 201 may be disposed in front of one or both eyes of user to allow the user to view the images rendered on the display screen of the HMD. The display screen is disposed behind the optics 201 so that the optics is between the display screen and the eyes of the user. The sensor 203 is configured to detect the user wearing the HMD by determining proximity of the user to the sensor. The light sources 209, in some implementations, are rendered around the optics 201 and are oriented to illuminate the eyes of the user, when activated. In other implementations, the light sources 209 may be disposed in any other location on the HMD so long as they are capable of illuminating the eyes of the user, when activated. The light sources 209 are configured to be activated, when the sensor 203 is functioning in gaze tracking mode. When the sensor 203 is functioning in glasses tracking mode, the sensor 203 may send a signal to activate a set of IR LEDs provided on the frame of the glasses. The cameras 204 are used to capture the images of indicators (e.g., IR LEDs) on the glasses or the gaze of the user.

Figure 4A:
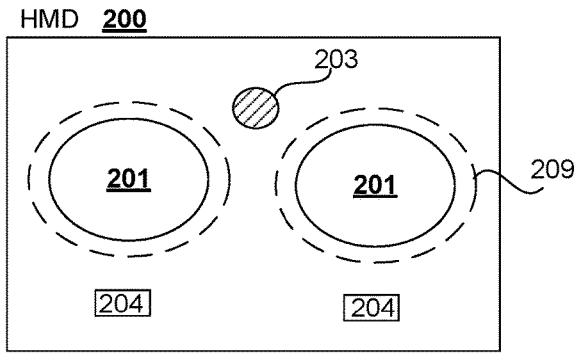
FIGS. 4A-4E illustrate different implementations of an image capturing device of the HMD used in conjunction with a sensor of the HMD in receiving images capturing gaze data of the user, in accordance to different embodiments of the invention.
Figure 4B:
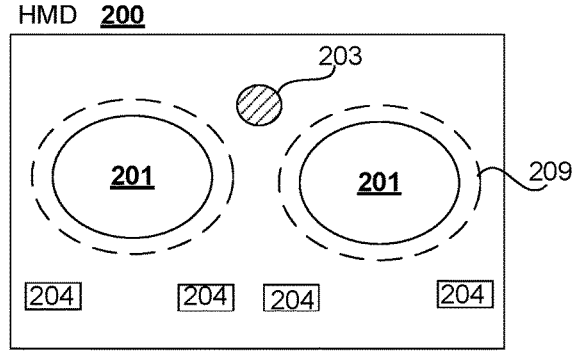
Figure 4C:
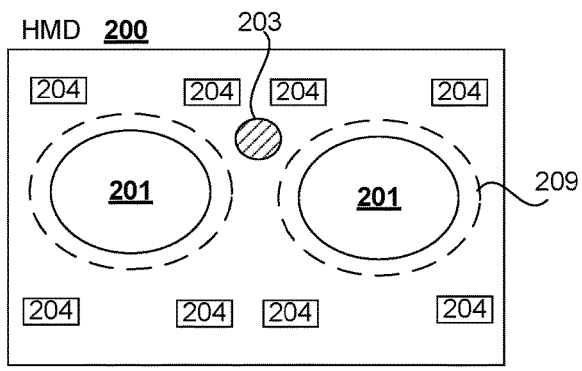
Figure 4D:
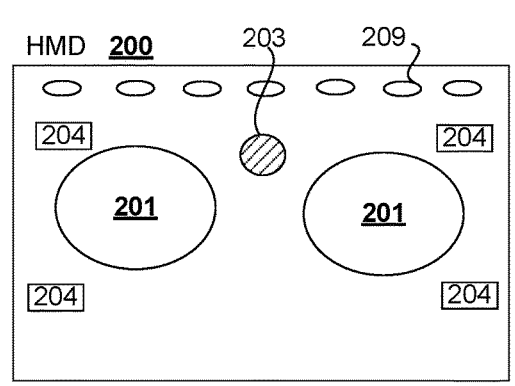
Figure 4E:
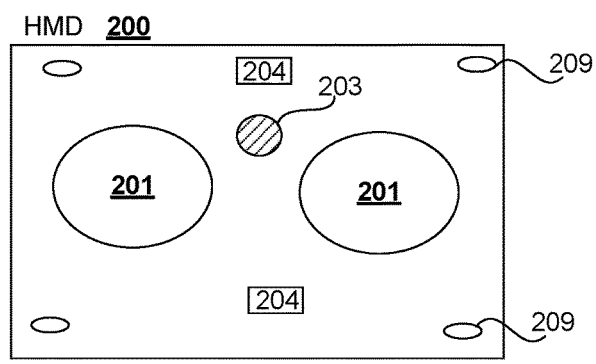

In FIG. 4A, a camera 204 is provided in front of each eye of the user and oriented below the optics 201 of the HMD and a plurality of light sources (i.e., light emitters) 209 are provided around the optics 201. In FIG. 4B, a pair of cameras 204 is provided below each optic 201 disposed in front of each eye of the user. FIG. 4C illustrates an alternate implementation wherein a pair of cameras 204 is disposed both above and below each optic 201 that is disposed in front of each eye of the user. FIG. 4D illustrates another variation wherein cameras 204 are disposed at the left top and bottom corners as well as the right top and bottom corners of the HMD. The light emitters 209 may be aligned in the top portion of the HMD, as shown in FIG. 4D or bottom portion or on the left and/or right portion (not shown), or any combinations thereof. The light emitters 209 are not restricted to the locations shown in FIGS. 4A-4E but could be located in any other location on the HMD 200. FIG. 4E illustrates another implementation, wherein a pair of cameras 204 are disposed along the central, vertical axis closer to the top and bottom edge of the HMD and the sensor 203 is provided below the camera disposed in the top portion of the central, vertical axis. As can be seen, various configurations may be adopted for the light emitters 209 and the cameras 204 on the HMD 200.

Figure 5:
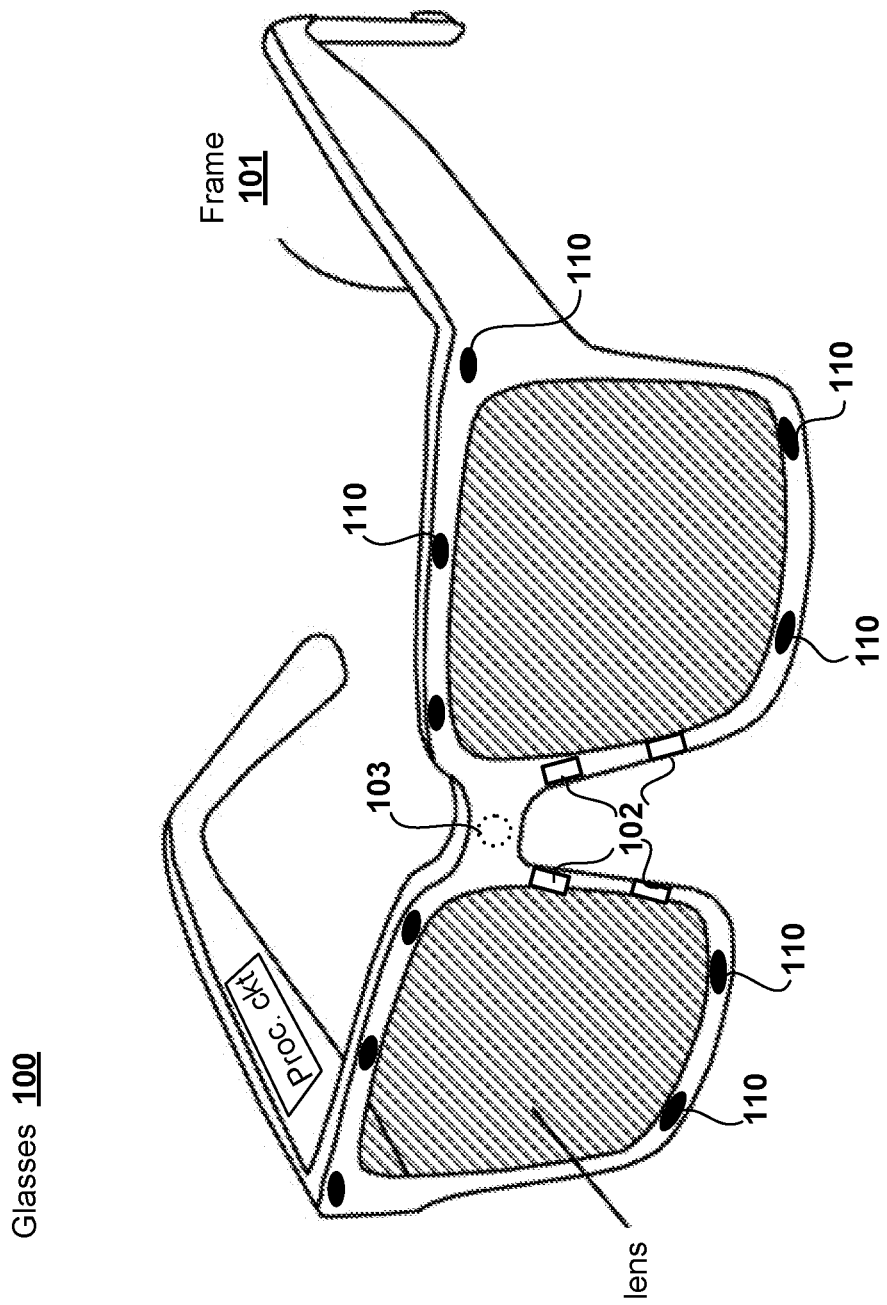
FIG. 5 illustrates an example configuration of eyeglasses worn by a user, in accordance with an embodiment of the invention.

FIG. 5 illustrates an example implementation of glasses worn by a user. The glasses 100 includes a processing circuitry defined by one or more processor 105 (not shown), one or more gaze processor 104 (not shown), and power circuit 106 (not shown). In addition to the processing circuitry, the glasses 100 also includes a plurality of frame position emitters 110 disposed on the frame 101 of the glasses and and one or more gaze sensors (i.e., cameras) 102. An emitter 103 is provided on the frame 101 and is configured to transmit signal indicative of presence of glasses and gaze data as time-based light pulses. In FIG. 5, the gaze sensors 102 are shown to be disposed on the frame near the bridge of the nose of a user, when the user is wearing the glasses. The position of the gaze sensors 102 is not restricted to the locations illustrated in FIG. 5 and that alternate locations for the gaze sensor 102 may also be considered. In some implementations, the cameras 102 may be located on a surface of the frame and directed toward eyes of the user to capture gaze data of the user. In alternate implementations, the glasses may include a waveguided gaze tracking system that may be employed to capture gaze data of the user. In such implementations, the camera may be embedded in the frames and configured to look at the internal reflections from the waveguide that directs the light from the user's eyes onto the glasses. The location of the various light emitters are not restricted to what is shown in FIG. 5 and variations in the location of the light emitters may also be considered.

Figure 6:
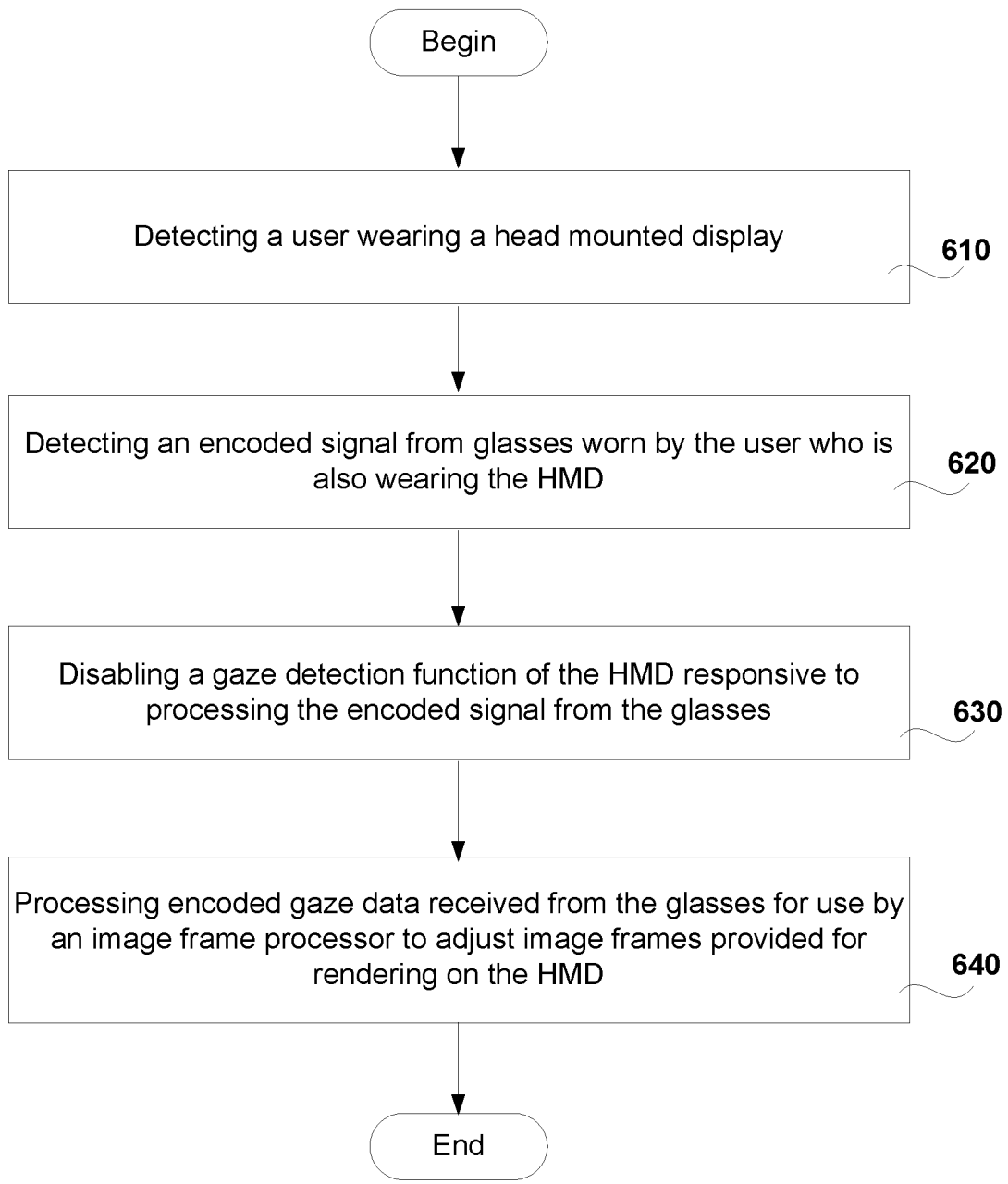
FIG. 6 illustrates method operations for tracking gaze direction of a user to adjust image frames provided to a head mounted display, in accordance with an embodiment of the invention.

FIG. 6 illustrates flow of operations for detecting gaze data of a user and adjusting image frames of an interactive application sent to the HMD for rendering. The method begins at operation 610, wherein a user wearing a head mounted display (HMD) is detected. A sensor disposed on the HMD may be used to detect proximity of a face of the user to the sensor of the HMD. The sensor (e.g., a proximity sensor) may include an emitter that emits a light signal toward the face of the user and a receiver that receives the light signal reflected back from the user's face to determine a distance of the face of the user to the sensor. Based on the evaluation, the sensor determines that the user is wearing the HMD.

The method further includes detecting an encoded signal indicative of glasses being worn by the user while the user is wearing the HMD, as illustrated in operation 620. The encoded signal may be transmitted by an emitter on the glasses as predefined pulses of light that is indicative of the presence of the glasses and the sensor on the HMD decodes the light pulses to obtain the encoded information (i.e., presence of the glasses). The encoded signal may, in addition to including data indicative of the presence of the glasses, may also include functional attributes of the glasses, such as identifier of the glasses, identifier of the user associated with the glasses, model and make of the glasses, power of lens, etc. These functional attributes may be used to validate the user wearing the glasses and the data emitted by the emitter of the glasses.

In response to receiving the encoded signal from the glasses, a gaze detection function of the HMD is disabled, as illustrated in operation 630. The sensor of the HMD is configured with a dual function, wherein in the first function (i.e., glasses tracking mode) the sensor is configured to track the glasses worn by the user, and in the second function (i.e. gaze tracking mode), the sensor is configured to determine proximity of the user to confirm that the user is wearing the HMD and to track the user's eyes to capture gaze data. When glasses are present, the sensor of the HMD 200 is functioning in the first mode, wherein the sensor tracks physical position of the glasses instead of the gaze of the user. Consequently, the sensor generates a signal to disable the light emitters on the HMD that are oriented toward the eyes of the user, thereby preventing the image capturing device on the HMD from tracking the eyes of the user. Instead, the sensor on the HMD is configured to activate frame position emitters 110 disposed on the glasses by sending a signal to the processor of the glasses, and signaling the camera on the HMD to track the frame position emitters of the glasses that are activated by the signal from the sensor of the HMD.

In some implementations, instead of the sensor of the HMD sending a signal to activate the frame position emitters of the glasses, the gaze processor or the processor of the glasses may activate the frame position emitters, in response to detecting the user wearing the HMD with the glasses. The activated frame position emitters on the glasses begin to emit light, which are tracked by the camera of the HMD. The tracked information is used by the processor of the HMD to determine physical position and orientation of the glasses with respect to the HMD.

The method concludes with operation 640 wherein the HMD 200 receives the encoded gaze data from the glasses. The encoded gaze data is decoded using a decoder at the HMD to obtain gaze data. The gaze data along with the physical position data of the glasses are then either fully processed at the HMD 200 or partially processed at the HMD or not processed at the HMD. The gaze data and the physical position data are then forwarded to a computing device for further processing and/or to adjust image frames generated by an interactive application, as illustrated in operation 640. The gaze data is used to determine foveate region and non-foveate region in the images frames. An image frame processor on the computing device may adjust the data provided in the images frames so as to provide more data in the foveate region of the image frames and less data in the non-foveate region that is outside the foveate region. The adjusted image frames are forwarded to the HMD, where it is interpreted. The interpreted image frames are forwarded to the display screen for rendering. The rendered image frames provide optimal data while ensuring the rendered images are optimal in quality.

Figure 7:
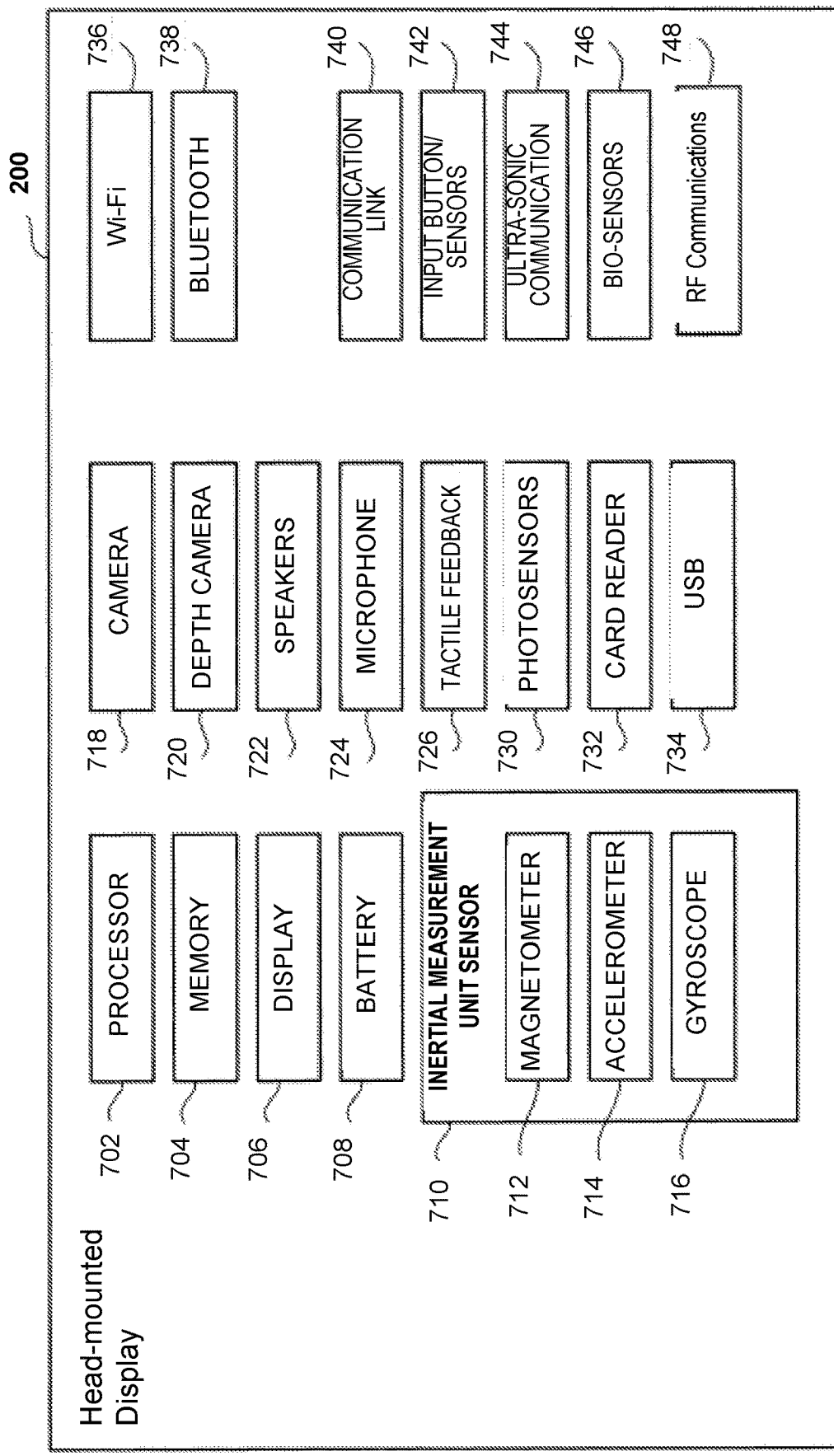
FIG. 7 illustrates various components of a HMD, in one embodiment of the invention.

FIG. 7 illustrates example components of an HMD 200, in accordance with an embodiment described in the present disclosure. It should be understood that more or less components can be included or excluded from the HMD 200, depending on the configuration and functions enabled. The HMD 200 includes a processor 702 for executing program instructions stored in memory 704. The memory device 704 of the HMD 200 is provided for storage purposes for various programs and data and, in one embodiment, includes both volatile and non-volatile memory.

A display 706 is included within the HMD 200 to provide a visual interface for viewing virtual reality (VR) content provided by an interactive application. In some embodiments, the visual interface of the display 706 may also be configured to provide a view of the physical space in which the user wearing the HMD is operating. The display 706 is defined by one single display screen, or may be defined by a separate display screen for each eye of the user. When two display screens are provided, it is possible to provide left-eye and right-eye video content separately. Separate presentation of video content to each eye, for example, provides for better immersive control of 3D content. In one embodiment wherein two display screens are provided in the HMD 200, the second screen is provided with second screen content by using the content provided for one eye, and then formatting the content for display in a two-dimensional (2D) format.

The content for one eye, in one embodiment, is the left-eye video feed, but in other embodiments is the right-eye video feed.

A battery 708 is provided as a power source for the HMD 200. In other embodiments, the power source includes an outlet connection to power. In other embodiments, an outlet connection to power and the battery 708 are both provided. An Inertial Measurement Unit (IMU) sensor module 710 includes any of various kinds of motion sensitive hardware, such as a magnetometer 712, an accelerometer 714, and a gyroscope 716 to measure and report specific force, angular rate and magnetic field of the HMD 200. The magnetometers 712, accelerometers 714 and gyroscopes are part of the position and orientation measurement devices of the HMD 200. In addition to the aforementioned sensors, additional sensors may be provided in the IMU sensor module 710. Data collected from the IMU sensor module 710 allows a computing device to track the user, the real-world objects, the HMD 200 and the hand-held controller (not shown) position in the physical space in which the user wearing the HMD 200 is operating.

A magnetometer 712 measures the strength and direction of the magnetic field in the vicinity of the HMD 200. In one embodiment, three magnetometers are used within the HMD 200, ensuring an absolute reference for the world-space yaw angle. In one embodiment, the magnetometer 712 is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. If necessary, this warp is calibrated using information from other sensors such as the gyroscope, or the camera.

In one embodiment, an accelerometer 714 is used together with magnetometer 712 to obtain the inclination and azimuth of the HMD 200. The accelerometer 714 is a device for measuring acceleration and gravity induced reaction forces. Single and multiple axis (e.g., six-axis) models are able to detect magnitude and direction of the acceleration in different directions. The accelerometer 714 is used to sense inclination, vibration, and shock. In one embodiment, three accelerometers are used to provide the direction of gravity, which gives an absolute reference for two angles (world-space pitch and world-space roll).

A gyroscope 716 is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes drift overtime without the existence of an absolute reference. To reduce the drift, the gyroscopes are reset periodically, which can be done using other available information, such as positional/orientation determination based on visual tracking of an object, accelerometer, magnetometer, etc.

A camera 718 is provided for capturing images and image streams of the real-world environment. In one embodiment, more than one camera (optionally) is included in the HMD 200, including a camera that is rear-facing (directed away from the user when the user is viewing the display of the HMD 200), and a camera that is front-facing (directed towards the user when the user is viewing the display of the HMD 200). Additional cameras may be disposed along the sides of the HMD to provide a broader view (e.g., 360° view) of the physical space surrounding the HMD 200. Additionally, in an embodiment, a depth camera 720 is included in the HMD 200 for sensing depth information of objects in the real-world environment. In addition to the cameras 718 and 720, additional one or more cameras may be disposed in the HMD 200 to capture user attributes by orienting the additional cameras toward the user's face or eyes.

The HMD 200 includes speakers 722 for providing audio output. Also, in one embodiment, a microphone 724 is included for capturing audio from the real-world environment, including sounds from the ambient environment, speech made by the user, etc. In an embodiment, the HMD 200 includes tactile feedback module 726 for providing tactile feedback to the user. In one embodiment, the tactile feedback module 726 is capable of causing movement and/or vibration of the HMD 200 so as to provide tactile feedback to the user. In specific embodiments, the tactile feedback may be provided to alert or warn the user of an obstacle or danger that may be present in the real-world environment based on the user's position.

Photosensors 730 are provided to detect one or more light beams. A card reader 732 is provided to enable the HMD 200 to read and write information to and from a memory card. A USB interface 734 is included as one example of an interface for enabling connection of peripheral devices, or connection to other devices, such as other portable devices, computers, game consoles, etc. In various embodiments of the HMD 200, any of various kinds of interfaces may be included to enable greater connectivity of the HMD 200.

In an embodiment, a Wi-Fi module 736 is included for enabling connection to the computer network via wireless networking technologies. Also, in one embodiment, the HMD 200 includes a Bluetooth module 738 for enabling wireless connection to other devices. A communications link 740 is included for connection to other devices. In one embodiment, the communications link 740 utilizes infrared transmission for wireless communication. In other embodiments, the communications link 740 utilizes any of various wireless or wired transmission protocols for communication with other devices.

Input buttons/sensors 742 are included to provide an input interface for the user. Any of various kinds of input interfaces may be included, such as buttons, gestures, touchpad, joystick, trackball, etc. In one embodiment, an ultra-sonic communication module 744 is included in HMD 200 for facilitating communication with other devices via ultrasonic technologies.

In an embodiment, bio-sensors 746 are included to enable detection of physiological data from the user. In one embodiment, the bio-sensors 746 include one or more dry electrodes for detecting bio-electric signals of the user through the user's skin, voice detection, eye retina detection to identify users/profiles, etc. In an embodiment, RF communication module 748 with a tuner is included for enabling communication using radio frequency signals and/or radar signals.

The foregoing components of HMD 200 have been described as merely exemplary components that may be included in HMD 200. In various embodiments described in the present disclosure, the HMD 200 may or may not include some of the various aforementioned components. Embodiments of the HMD 200 may additionally include other components not presently described, but known in the art, for purposes of facilitating aspects of the present invention as herein described.

In one embodiment, the HMD 200 includes light emitting diodes, which are used in addition to the photosensors 730 to determine a position and/or orientation of the HMD 200. For example, the LEDs and a camera located within the environment in which the HMD 200 is located are used to confirm or deny a position and/or orientation of the HMD 200 that are determined using the photosensors 730.

It will be appreciated by those skilled in the art that in various embodiments described in the present disclosure, the aforementioned HMD is utilized in conjunction with a handheld device, such as a controller, and an interactive application displayed on a display to provide various interactive functions. The exemplary embodiments described herein are provided by way of example only, and not by way of limitation.

In one embodiment, clients and/or client devices, as referred to herein, may include HMDs, terminals, laptop computers, personal computers, game consoles, tablet computers, general purpose computers, special purpose computers, mobile computing devices, such as cellular phones, handheld game playing devices, etc., set-top boxes, streaming media interfaces/devices, smart televisions, kiosks, wireless devices, digital pads, stand-alone devices, and/or the like that are capable of being configured to fulfill the functionality of a client as defined herein. Typically, clients are configured to receive encoded video streams, decode the video streams, and present the resulting video to a user, e.g., interactive scenes from a game to a player of the game. The processes of receiving encoded video streams and/or decoding the video streams typically includes storing individual video frames in a receive buffer of the client. The video streams may be presented to the user on a display of the HMD 200 or on a display integral to client or on a separate display device such as a monitor or television communicatively coupled to the client.

Clients are optionally configured to support more than one game player. For example, a game console may be configured to support a multiplayer game in which more than one player (e.g., P1, P2, . . . Pn) has opted to play the game at any given time. Each of these players receives or shares a video stream, or a single video stream may include regions of a frame generated specifically for each player, e.g., generated based on each player's point of view. The clients are either co-located or geographically dispersed. The number of clients included in a game system varies widely from one or two to thousands, tens of thousands, or more. As used herein, the term "game player" is used to refer to a person that plays a game and the term "game playing device" is used to refer to a computing device that is used to play a game. In some embodiments, the game playing device may refer to a plurality of computing devices that cooperate to deliver a game experience to the user.

For example, a game console and an HMD cooperate with a video server system to deliver a game viewed through the HMD. In one embodiment, the game console receives the video stream from the video server system and the game console forwards the video stream, or updates to the video stream, to the HMD and/or television for rendering. In an alternate embodiment, the HMD cooperates with a game console to receive and render content of a game executing on the game console. In this embodiment, the video stream of the game is transmitted by the game console to the HMD for rendering.

An HMD is used for viewing and/or interacting with any type of content produced or used, such as video game content, movie content, video clip content, web content, weblogs, advertisement content, contest content, gambling game content, meeting content, social media content (e.g., postings, messages, media streams, friend events and/or game play), video portions and/or audio content, and content made for consumption from sources over the internet via browsers and applications, and any type of streaming content. Of course, the foregoing listing of content is not limiting, as any type of content can be rendered so long as it can be viewed in the HMD or rendered to a screen of the HMD.

In one embodiment, clients further include systems for modifying received video. In one embodiment, the video is modified to generate augmented reality content. For example, a client may perform an overlay of one video image on another video image, image of a real-world object over a video image, crop a video image, and/or the like. In one embodiment, the real-world object is provided as an overlay in a "ghost" format, wherein a ghost-like image of the real-world object is presented over the video image. In another embodiment, the real-world object may be provided as a wired outline over the video image. The aforementioned format of presenting the real-world object over a video image may be extended to overlaying of one video image on another video image. The aforementioned formats are provided as examples and that other forms of modifying the video may also be engaged.

In another example, clients receive various types of video frames, such as I-frames, P-frames and B-frames, and to process these frames into images for display to a user. In some embodiments, number of clients is configured to perform further rendering, sharing, conversion to 3-D, conversion to 2D, distortion removal, sizing, or like operations on the video stream. A number of clients is optionally configured to receive more than one audio or video stream.

The controller includes, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

In some embodiments, a video source includes rendering logic, e.g., hardware, firmware, and/or software stored on a computer readable medium such as storage. This rendering logic is configured to create video frames of the video stream based on the game state, for example. All or part of the rendering logic is optionally disposed within one or more graphics processing unit (GPU). Rendering logic typically includes processing stages configured for determining the three-dimensional spatial relationships between real-world objects, between real-world objects and user, and/or for applying appropriate textures, etc., based on the game state and viewpoint. The rendering logic produces raw video that is encoded. For example, the raw video is encoded according to an Adobe Flash® standard, HTML-5, .wav, H.264, H.263, On2, VP6, VC-1, WMA, Huffyuv, Lagarith, MPG-x, Xvid, FFmpeg, x264, VP6-8, real video, mp3, or the like. The encoding process produces a video stream that is optionally packaged for delivery to a decoder on a device, such as the HMD 200. The video stream is characterized by a frame size and a frame rate. Typical frame sizes include 800×600, 1280×720 (e.g., 720p), 1024×768, 1080p, although any other frame sizes may be used. The frame rate is the number of video frames per second. In one embodiment, a video stream includes different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In one embodiment, a cloud gaming server is configured to detect the type of client device (e.g., computing device 300, HMD 200, etc.) which is being utilized by the user, and provide a cloud-gaming experience appropriate to the user's client device. For example, image settings, audio settings and other types of settings may be optimized for the user's client device.

In one embodiment, the HMD 200 is used to render images of a virtual reality (VR) space of a video game, wherein images of VR objects that correspond with real-world objects are introduced into the VR space. The user is allowed to interact with the real-world object using the images of the VR objects rendered in the VR space while the user is interacting with content presented in the VR space. In some embodiments, user interactions with the real-world object cause a portion of a display screen of the HMD 200 to transition to a transparent view so as to allow the user to view the real-world object during his/her interaction with the real-world object.

In one implementation, various hardware and user interfaces of a gaming console or a computing device that may be used in various implementations of the invention will now be described with reference to an example system architecture. The example gaming console may include a Sony® Playstation 3® (PS3) or a Playstation 4® (PS4) entertainment device, which may be compatible with controllers for implementing an embodiment of the present invention. Although the PS3 gaming console system architecture is explained in detail, it should be noted that the various implementations described herein can be extended to system architecture of a different gaming console or computing device. Various peripheral devices are connectable to the system unit. The system unit is similar to the computing device/console 300 of FIG. 3. The example system unit includes: a processor, which may be a 8 core processor, as in PS3, or a multi-core processor, as in PS4; a Rambus® dynamic random access memory (XDRAM) unit, as in PS3, or a graphics dynamic random access memory, such as a GDDR5, as in PS4; a Reality Synthesizer graphics unit (e.g., 550 MHz GPU) with a dedicated video random access memory (VRAM) unit, as in PS3, or 800 or 900 MHz GPU with shared graphics memory in PS4 and PS4 Pro; and an I/O bridge. The system unit also comprises a Blu Ray® Disk Read Only Memory (BD-ROW)) (optical) disk reader for reading from a disk and a removable slot-in hard disk drive (HDD), accessible through the I/O bridge. Optionally the system unit also comprises a memory card reader for reading compact flash memory cards, Memory Stick® memory cards and the like, which is similarly accessible through the I/O bridge and in PS4, a built-in DVR to record games.

The I/O bridge also connects to six Universal Serial Bus (USB) 2.0 ports; a gigabit Ethernet port; an IEEE 802.11b/g wireless network (Wi-Fi) port; and a Bluetooth® wireless link port capable of supporting of up to seven Bluetooth connections.

In operation the I/O bridge handles all wireless, USB and Ethernet data, including data from one or more game controllers (DualShock 3 controller, as in PS3, or a PS4 DualShock 4 controller, as in PS4, etc.). For example when a user is playing a game, the I/O bridge receives data from the game controller via a Bluetooth link and directs it to the processor (in PS3) or multi-core processor (in PS4), which updates the current state of the game accordingly. Further, other image and move sensors provide data captured during game play of the user, to the I/O bridge, which directs it to the respective processor. The game controllers (e.g., game controllers of PS4) include a share button option for sharing a game, a clickable touchpad, a rechargeable battery (lithium-ion or other type), etc.

The wireless, USB and Ethernet ports also provide connectivity for other peripheral devices in addition to game controllers, such as: a remote control; a keyboard; a mouse; a portable entertainment device such as a Sony Playstation Portable® entertainment device; a video camera such as an EyeToy® video camera; a microphone headset; and a removable hard drive. Such peripheral devices may therefore in principle be connected to the system unit wirelessly; for example the portable entertainment device may communicate via a Wi-Fi ad-hoc connection, whilst the microphone headset may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader may be connected to the system unit via a USB port, enabling the reading of memory cards of the kind used by the Playstation® or Playstation 2® devices.

In the present implementation, the game controller is operable to communicate wirelessly with the system unit via the Bluetooth link. However, the game controller can instead be connected to a USB port, thereby also providing power by which to charge the battery of the game controller. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control is also operable to communicate wirelessly with the system unit via a Bluetooth link. The remote control comprises controls suitable for the operation of the Blu Ray™ Disk BD-ROM reader and for the navigation of disk content.

The Blu Ray™ Disk BD-ROM reader is operable to read Compact Disc, read only memory (CD-ROMs) compatible with the Playstation and PlayStation 2 devices, in addition to conventional pre-recorded and recordable compact discs (CDs), and so-called Super Audio CDs. The Blu Ray™ Disk BD-ROM reader is also operable to read Digital versatile disc-read only memory (DVD-ROMs) compatible with the Playstation 2™ and PlayStation 3™ devices, in addition to conventional pre-recorded and recordable DVDs. The Blu Ray™ Disk BD-ROM reader is further operable to read BD-ROMs compatible with the Playstation 3 device, as well as conventional pre-recorded and recordable Blu-Ray Disks.

The system unit is operable to supply audio and video, either generated or decoded by the Playstation 3 or Playstation 4 device via the Reality Synthesizer graphics unit, through audio and video connectors to a display and sound output device such as a monitor or television set having a display and one or more loudspeakers. The audio connectors may include conventional analogue and digital outputs whilst the video connectors may variously include component video, S-video, composite video and one or more High Definition Multimedia Interface (HDMI) outputs. Consequently, video output may be in formats such as PAL or NTSC, or in 720p, 1080i or 1080p high definition and 4K, HDR.

Audio processing (generation, decoding and so on) is performed by the Cell processor 1302. The PlayStation 3 device's operating system supports Dolby® 5.1 surround sound, Dolby® Theatre Surround (DTS), and the decoding of 7.1 surround sound from Blu-Ray® disks.

In the present implementation, the video camera includes a CMOS (Complementary Metal Oxide Semiconductor) image sensor (although a charge-coupled device (CCD) image sensor may also be used), an LED indicator, and hardware-based real-time data compression and encoding apparatus so that compressed video data may be transmitted in an appropriate format such as an intra-image based MPEG (motion picture expert group) standard for decoding by the system unit. The camera LED indicator is arranged to illuminate in response to appropriate control data from the system unit, for example to signify adverse lighting conditions. Implementations of the video camera may variously connect to the system unit via a USB, Bluetooth or Wi-Fi communication port. Implementations of the video camera may include one or more associated microphones and also be capable of transmitting audio data. In implementations of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit, an appropriate piece of software such as a device driver should be provided. Device driver technology is well-known and will not be described in detail here, except to say that the skilled man will be aware that a device driver or similar software interface may be required in the present implementation described.

The Processor has an architecture comprising four basic components: external input and output structures comprising a memory controller and a dual bus interface controller; a main processor referred to as the Power Processing Element; eight co-processors referred to as Synergistic Processing Elements (SPEs); and a circular data bus connecting the above components referred to as the Element Interconnect Bus. The total floating point performance of the Processor is 218 GFLOPS, compared with the 6.2 GFLOPs of the Playstation 2 device's Emotion Engine.

The Power Processing Element (PPE) is based upon a two-way simultaneous multithreading Power compliant PowerPC core (PPU) running with an internal clock of 3.2 GHz. It comprises a 512 kB level 2 (L2) cache and a 32 kB level 1 (L1) cache. The PPE is capable of eight single position operations per clock cycle, translating to 25.6 GFLOPs at 3.2 GHz. The primary role of the PPE is to act as a controller for the Synergistic Processing Elements, which handle most of the computational workload. In operation the PPE maintains a job queue, scheduling jobs for the Synergistic Processing Elements and monitoring their progress. Consequently each Synergistic Processing Element runs a kernel whose role is to fetch a job, execute it and synchronized with the PPE.

Each Synergistic Processing Element (SPE) comprises a respective Synergistic Processing Unit (SPU), and a respective Memory Flow Controller (MFC) comprising in turn a respective Dynamic Memory Access Controller (DMAC), a respective Memory Management Unit (MMU) and a bus interface (not shown). Each SPU is a RISC processor clocked at 3.2 GHz and comprising 256 kB local RAM, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU does not directly access the system memory XDRAM 1426; the 64-bit addresses formed by the SPU are passed to the MFC which instructs its DMA controller to access memory via the Element Interconnect Bus and the memory controller.

The Element Interconnect Bus (EIB) is a logically circular communication bus internal to the Processor which connects the above processor elements, namely the PPE, the memory controller, the dual bus interface and the 8 SPEs, totaling 12 participants. Participants can simultaneously read and write to the bus at a rate of 8 bytes per clock cycle. As noted previously, each SPE comprises a DMAC for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz (giga hertz).

The memory controller comprises an XDRAM interface, developed by Rambus Incorporated. The memory controller interfaces with the Rambus XDRAM 1426 with a theoretical peak bandwidth of 25.6 GB/s.

The dual bus interface comprises a Rambus FlexIO® system interface. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Processor and the I/O Bridge via controller and the Reality Synthesizer graphics unit via controller.

Data sent by the Processor to the Reality Synthesizer graphics unit will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the thirddimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's experience. For example, computer generated costumes can be inserted over the user's clothing, and computer generated light sources can be utilized to project virtual shadows within a video scene. Hence, using the embodiments of the present invention and a depth camera, users can experience an interactive environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

Figure 8:
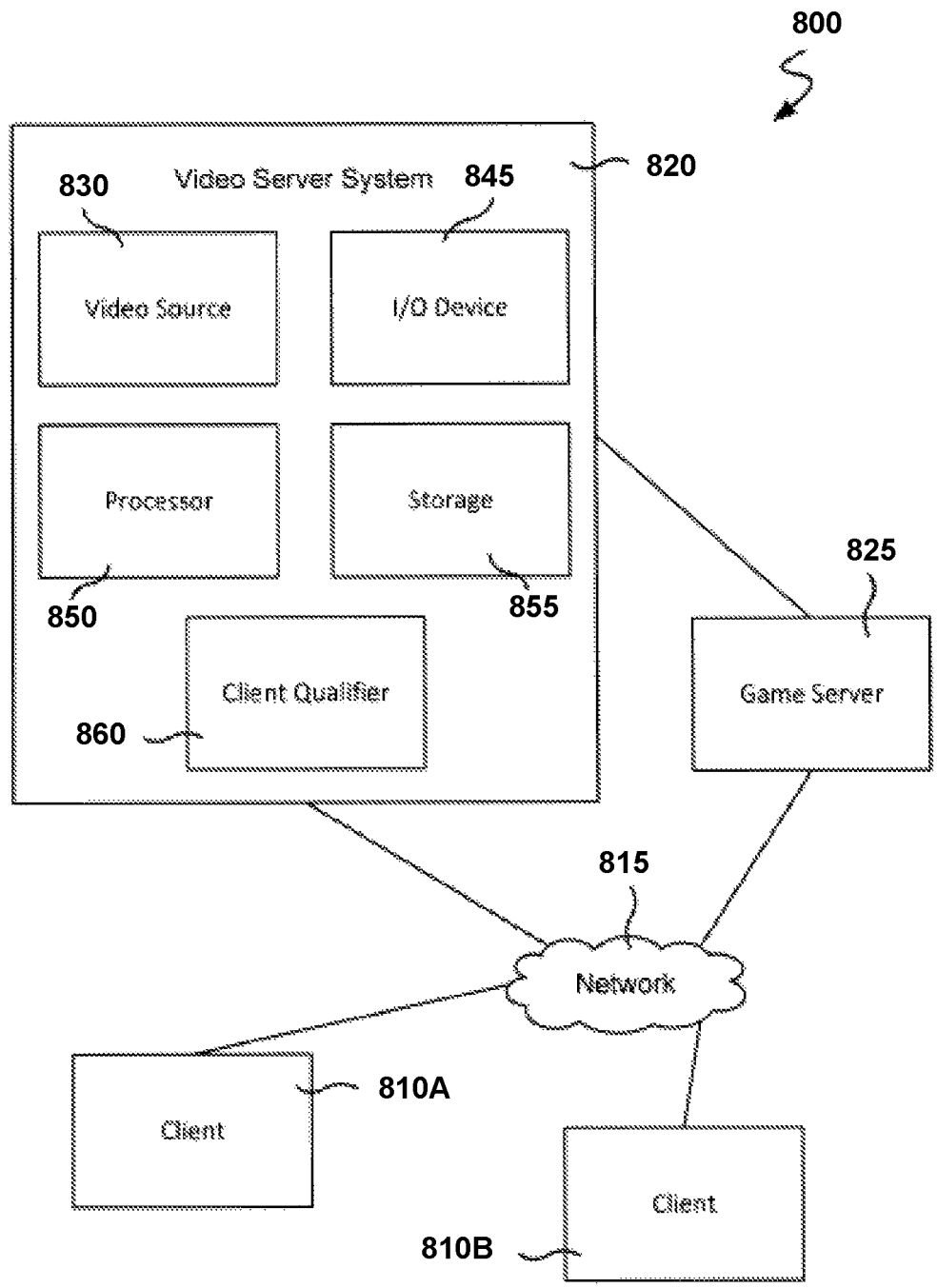
FIG. 8 illustrates a block diagram of an example game system for which the gaze of a user are tracked, in accordance with an embodiment of the invention.

FIG. 8 is a block diagram of a Game System 800, according to various embodiments of the invention. Game System 800 is configured to provide a video stream to one or more Clients 810 via a Network 815. Game System 800 typically includes a Video Server System 820 and an optional game server 825. Video Server System 820 is configured to provide the video stream to the one or more Clients 810 with a minimal quality of service. For example, Video Server System 820 may receive a game command that changes the state of or a point of view within a video game, and provide Clients 810 with an updated video stream reflecting this change in state with minimal lag time. The Video Server System 820 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the invention.

Clients 810, referred to herein individually as 810A, 810B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 810 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 810 or on a separate device such as a monitor or television. Clients 810 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 810 are optionally geographically dispersed. The number of clients included in Game System 800 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 820 to deliver a game viewed through the HMD. In one embodiment, the game console receives the video stream from the video server system 820, and the game console forwards the video stream, or updates to the video stream, to the HMD for rendering.

Clients 810 are configured to receive video streams via Network 815. Network 815 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 810 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 810 may, but are not required to, further include systems configured for modifying received video. For example, a client may be configured to perform further rendering, to overlay one video image on another video image, to crop a video image, and/or the like. For example, Clients 810 may be configured to receive various types of video frames, such as I-frames, P-frames and B-frames, and to process these frames into images for display to a user. In some embodiments, a member of Clients 810 is configured to perform further rendering, shading, conversion to 3-D, or like operations on the video stream. A member of Clients 810 is optionally configured to receive more than one audio or video stream. Input devices of Clients 810 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 810 is generated and provided by Video Server System 820. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 810 are typically configured to receive inputs from a user. These inputs may include game commands configured to change the state of the video game or otherwise affect game play. The game commands can be received using input devices and/or may be automatically generated by computing instructions executing on Clients 810. The received game commands are communicated from Clients 810 via Network 815 to Video Server System 820 and/or Game Server 825. For example, in some embodiments, the game commands are communicated to Game Server 825 via Video Server System 820. In some embodiments, separate copies of the game commands are communicated from Clients 810 to Game Server 825 and Video Server System 820. The communication of game commands is optionally dependent on the identity of the command. Game commands are optionally communicated from Client 810A through a different route or communication channel that that used to provide audio or video streams to Client 810A.

Game Server 825 is optionally operated by a different entity than Video Server System 820. For example, Game Server 825 may be operated by the publisher of a multiplayer game. In this example, Video Server System 820 is optionally viewed as a client by Game Server 825 and optionally configured to appear from the point of view of Game Server 825 to be a prior art client executing a prior art game engine. Communication between Video Server System 820 and Game Server 825 optionally occurs via Network 815. As such, Game Server 825 can be a prior art multiplayer game server that sends game state information to multiple clients, one of which is game server system 820. Video Server System 820 may be configured to communicate with multiple instances of Game Server 825 at the same time. For example, Video Server System 820 can be configured to provide a plurality of different video games to different users. Each of these different video games may be supported by a different Game Server 825 and/or published by different entities. In some embodiments, several geographically distributed instances of Video Server System 820 are configured to provide game video to a plurality of different users. Each of these instances of Video Server System 820 may be in communication with the same instance of Game Server 825. Communication between Video Server System 820 and one or more Game Server 825 optionally occurs via a dedicated communication channel. For example, Video Server System 820 may be connected to Game Server 825 via a high bandwidth channel that is dedicated to communication between these two systems.

Video Server System 820 comprises at least a Video Source 830, an I/O Device 845, a Processor 850, and non-transitory Storage 855. Video Server System 820 may include one computing device or be distributed among a plurality of computing devices. These computing devices are optionally connected via a communications system such as a local area network.

Video Source 830 is configured to provide a video stream, e.g., streaming video or a series of video frames that form a moving picture. In some embodiments, Video Source 830 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 825. Game Server 825 may maintain a copy of the state of the game based on game commands received from multiple players using geographically disperse clients. In these cases, the game state is provided by Game Server 825 to Video Source 830, wherein a copy of the game state is stored and rendering is performed. Game Server 825 may receive game commands directly from Clients 810 via Network 815, and/or may receive game commands via Video Server System 820.

Video Source 830 typically includes rendering logic, e.g., hardware, firmware, and/or software stored on a computer readable medium such as Storage 855. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 810. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 830 includes a video recording device such as a camera. This camera may be used to generate delayed or live video that can be included in the video stream of a computer game. The resulting video stream, optionally includes both rendered images and images recorded using a still or video camera. Video Source 830 may also include storage devices configured to store previously recorded video to be included in a video stream. Video Source 830 may also include motion or positioning sensing devices configured to detect motion or position of an object, e.g., person, and logic configured to determine a game state or produce video-based on the detected motion and/or position.

Video Source 830 is optionally configured to provide overlays configured to be placed on other video. For example, these overlays may include a command interface, log in instructions, messages to a game player, images of other game players, video feeds of other game players (e.g., webcam video). In embodiments of Client 810A including a touch screen interface or a gaze detection interface, the overlay may include a virtual keyboard, joystick, touch pad, and/or the like. In one example of an overlay a player's voice is overlaid on an audio stream. Video Source 830 optionally further includes one or more audio sources.

In embodiments wherein Video Server System 820 is configured to maintain the game state based on input from more than one player, each player may have a different point of view comprising a position and direction of view. Video Source 830 is optionally configured to provide a separate video stream for each player based on their point of view. Further, Video Source 830 may be configured to provide a different frame size, frame data size, and/or encoding to each of Client 810. Video Source 830 is optionally configured to provide 3-D video.

I/O Device 845 is configured for Video Server System 820 to send and/or receive information such as video, commands, requests for information, a game state, gaze information, device motion, device location, user motion, client identities, player identities, game commands, security information, audio, and/or the like. I/O Device 845 typically includes communication hardware such as a network card or modem. I/O Device 845 is configured to communicate with Game Server 825, Network 815, and/or Clients 810.

Processor 850 is configured to execute logic, e.g. software, included within the various components of Video Server System 820 discussed herein. For example, Processor 850 may be programmed with software instructions in order to perform the functions of Video Source 830, Game Server 825, and/or a Client Qualifier 860. Video Server System 820 optionally includes more than one instance of Processor 850. Processor 850 may also be programmed with software instructions in order to execute commands received by Video Server System 820, or to coordinate the operation of the various elements of Game System 800 discussed herein. Processor 850 may include one or more hardware device. Processor 850 is an electronic processor.

Storage 855 includes non-transitory analog and/or digital storage devices. For example, Storage 855 may include an analog storage device configured to store video frames. Storage 855 may include a computer readable digital storage, e.g. a hard drive, an optical drive, or solid state storage. Storage 815 is configured (e.g. by way of an appropriate data structure or file system) to store video frames, artificial frames, a video stream including both video frames and artificial frames, audio frame, an audio stream, and/or the like. Storage 855 is optionally distributed among a plurality of devices. In some embodiments, Storage 855 is configured to store the software components of Video Source 830 discussed elsewhere herein. These components may be stored in a format ready to be provisioned when needed.

Video Server System 820 optionally further comprises Client Qualifier 860. Client Qualifier 860 is configured for remotely determining the capabilities of a client, such as Clients 810A or 810B. These capabilities can include both the capabilities of Client 810A itself as well as the capabilities of one or more communication channels between Client 810A and Video Server System 820. For example, Client Qualifier 860 may be configured to test a communication channel through Network 815.

Client Qualifier 860 can determine (e.g., discover) the capabilities of Client 810A manually or automatically. Manual determination includes communicating with a user of Client 810A and asking the user to provide capabilities. For example, in some embodiments, Client Qualifier 860 is configured to display images, text, and/or the like within a browser of Client 810A. In one embodiment, Client 810A is an HMD that includes a browser. In another embodiment, client 810A is a game console having a browser, which may be displayed on the HMD. The displayed objects request that the user enter information such as operating system, processor, video decoder type, type of network connection, display resolution, etc. of Client 810A. The information entered by the user is communicated back to Client Qualifier 860.

Automatic determination may occur, for example, by execution of an agent on Client 810A and/or by sending test video to Client 810A. The agent may comprise computing instructions, such as java script, embedded in a web page or installed as an add-on. The agent is optionally provided by Client Qualifier 860. In various embodiments, the agent can find out processing power of Client 810A, decoding and display capabilities of Client 810A, lag time reliability and bandwidth of communication channels between Client 810A and Video Server System 820, a display type of Client 810A, firewalls present on Client 810A, hardware of Client 810A, software executing on Client 810A, registry entries within Client 810A, and/or the like.

Client Qualifier 860 includes hardware, firmware, and/or software stored on a computer readable medium. Client Qualifier 860 is optionally disposed on a computing device separate from one or more other elements of Video Server System 820. For example, in some embodiments, Client Qualifier 860 is configured to determine the characteristics of communication channels between Clients 810 and more than one instance of Video Server System 820. In these embodiments the information discovered by Client Qualifier can be used to determine which instance of Video Server System 820 is best suited for delivery of streaming video to one of Clients 810.

Embodiments of the present invention may be practiced with various computer system configurations including hand-held devices, microprocessor systems, microprocessor-based or programmable consumer electronics, minicomputers, mainframe computers and the like. Several embodiments of the present invention can also be practiced in distributed computing environments where tasks are performed by remote processing devices that are linked through a wire-based or wireless network.

With the above embodiments in mind, it should be understood that a number of embodiments of the present invention can employ various computer-implemented operations involving data stored in computer systems. These operations are those requiring physical manipulation of physical quantities. Any of the operations described herein that form part of various embodiments of the present invention are useful machine operations. Several embodiments of the present invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Various embodiments of the present invention can also be embodied as computer readable code on a computer readable medium. The computer readable medium is any data storage device that can store data, which can be thereafter be read by a computer system. Examples of the computer readable medium include hard drives, network attached storage (NAS), read-only memory (ROM), random-access memory, compact disc-ROMs (CD-ROMs), CD-recordables (CD-Rs), CD-rewritables (RWs), magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the various embodiments of the present invention is not to be limited to the details given herein, but may be modified within the scope and equivalents of the appended claims.

The invention claimed is:

1. A method, comprising:
   detecting, by a sensor of a head mounted display (HMD), that the HMD is being worn by a user, the detecting identifies proximity of a face of the user to the sensor of the HMD;
   detecting, by the sensor of the HMD, an encoded signal indicative of glasses being worn by the user while wearing the HMD;
   disabling, by the HMD, a gaze detection function of the HMD responsive to processing of the encoded signal from said glasses; and
   receiving, by the HMD, encoded gaze data from said glasses, the encoded gaze data being used by an image frame processor that produces image frames for rendering on a display screen of the HMD.

2. The method of claim 1, wherein the sensor is configured with a dual function, wherein a first function is configured to detect proximity of a user, and a second function is configured for receiving said encoded signal and said encoded gaze data.

3. The method of claim 1, wherein the encoded signal includes predefined pulses of light, the pulses of light provide encoded data that is indicative of presence of said glasses.

4. The method of claim 1, wherein said encoded data identifies a model of said glasses and functional attributes of said glasses including data related to power level of said glasses.

5. The method of claim 1, wherein disabling includes communicating with the gaze detection function to disable a process operated by the gaze detection function,
   wherein the disabling includes deactivating one or more optical elements disposed on the HMD for emitting light toward eyes of the user and deactivating at least one image sensor for capturing images of the eyes of the user while being illuminated by the one or more optical elements.

6. The method of claim 1, wherein disabling the gaze detection function of the HMD further includes enabling gaze detection function of the glasses via a signal from the HMD to the glasses, wherein enabling the gaze detection function of the glasses includes engaging one or more infrared (IR) lights and one or more cameras of the glasses to capture images of the eyes of the user, and processing the captured images to generate gaze data for onward transmission to a processor of the HMD,
   wherein the processor of the HMD is configured to communicate the gaze data to a computer.

7. The method of claim 6, wherein the computer is integrated into the HMD or operates as a separate computer that is communicatively coupled to the HMD through wireless or wired connection.

8. The method of claim 6, wherein processing the images includes performing pre-processing of the images by the processor of the HMD to identify gaze data received from said glasses prior to forwarding to the computer.

9. The method of claim 6, wherein processing the images includes packetizing data representing the images for transmitting to the computer for further processing to identify gaze data, wherein the data that is packetized is raw gaze data received from said glasses.

10. The method of claim 1, wherein the encoded gaze data is received as optical pulses, the optical pulses are triggered at a rate and frequency that is predefined, the optical pulses used to construct coded data that embodies gaze data detected by the glasses, the optical pulses transmitted to the sensor of the HMD for further processing by a processor of the HMD.

11. The method of claim 1, wherein the image frame processor is executed by a computer communicatively coupled to the HMD, the computer configured to produce frames of content for rendering on the display screen of the HMD, wherein the frames of content being modified based on the gaze data.

12. The method of claim 11, wherein the modification includes adjusting the frames of content to include foveated regions, said foveated regions identified based on the gaze data.

13. The method of claim 12, wherein data for said foveated regions are produced with higher resolution relative to non-foveated regions that surround said foveated regions.

14. The method of claim 12, wherein using said gaze data to include foveated regions causes reduction in data rate transmission for the image frames transmitted by the computer for rendering on a display screen of the HMD.

15. The method of claim 1, wherein the signal encoding data is a wireless signal communicated by the glasses to the HMD via a wireless, near-field communication connection.

16. The method of claim 1, further includes enabling the gaze detection function of the HMD to capture the gaze data of the user, when no glasses is detected by the sensor of the HMD, the enabling operates a process of activating at least one optical element on the HMD to illuminate eyes of the user and at least one sensor on the HMD for capturing position and gaze of the eyes of the user while the optical element on the HMD is illuminating the eyes of the user.

17. A system for tracking gaze information of a user, comprising:
   glasses having a pair of lens disposed in a frame, the pair of lens configured to provide vision correction based on vision attributes of a user wearing the glasses, the glasses includes,
   a gaze sensor located on the glasses and directed toward eyes of the user to capture gaze data of the user;
   a gaze processor configured to, generate an encoded signal that is indicative of the glasses worn by the user while the user is wearing a head mounted display (HMD);

process the gaze data captured by the gaze sensor to generate encoded gaze data;

an emitter configured to process, (a) the encoded signal to generate predefined pulses of data representing presence of the glasses, and (b) the encoded gaze data representing gaze information of the user captured by the gaze sensor to generate pulses of data representing the gaze data;

the HMD having a sensor that is configured to,
  (i) detect the user wearing the HMD by determining proximity of a face of the user to the sensor of the HMD;
  (ii) determine if the user wearing the HMD is also wearing the glasses;
  (iii) disable a gaze detection function of the HMD, in response to determining the user wearing the glasses, or activate the gaze detection function of the HMD to capture the gaze information of the user, upon determining the user not wearing the glasses;

wherein the HMD further includes,
  a decoder to process pulses of data provided by the emitter of the glasses to provide gaze information of the user; and
  an image frame processor configured to process the gaze information provided in the pulses of data by the emitter or captured by the sensor of the HMD to produce image frames for rendering on a display screen of the HMD.

18. The system of claim 17, wherein the sensor of the HMD is configured with a dual function, wherein a first function is configured to detect proximity of a user, and a second function is configured to receive said encoded signal and said encoded gaze data.

19. The system of claim 17, wherein the decoder in the HMD is an infrared photo diode or a transceiver.

20. The system of claim 17, wherein the glasses include one or more optical elements disposed on the frame that are configured to emit light toward the eyes of the user, to enable the gaze sensor of the glasses to capture the gaze data of the user while the eyes of the user are being illuminated by said one or more optical elements.

21. The system of claim 20, wherein the one or more optical elements is infrared (IR) light emitting diodes (LEDs).

22. The system of claim 20, wherein the glasses further includes a second set of optical elements disposed on an outside surface of the frame, the second set of optical elements configured to be activated upon detecting presence of the HMD on the user, to allow the sensor of the HMD to capture images of the second set of optical elements disposed on the glasses, when the gaze detection function of the HMD is disabled.

23. The system of claim 20, wherein the HMD further includes one or more optical elements that are disposed on the HMD and directed toward eyes of the user, the one or more optical elements are activated to enable the sensor of the HMD to capture position and gaze of the eyes of the user while the eyes of the user are being illuminated by said one or more optical elements of the HMD, when the gaze detection function of the HMD is activated.

24. The system of claim 22, wherein the sensor of the HMD is further configured to disable the one or more optical elements of the HMD in response to disabling the gaze detection function of the HMD.

25. The system of claim 24, wherein the disable of the gaze detection function of the HMD further includes generating a signal, by the sensor of the HMD, to activate the second set of optical elements on the glasses and to disable the gaze sensor of the glasses.

26. The system of claim 17, wherein the glasses is communicatively coupled to the HMD through a wireless, near-field communication connection to transmit the encoded signal and encoded gaze data to the HMD.

27. The system of claim 17, wherein the image frame processor of the HMD, when executed, is configured to communicate the gaze information to a computer communicatively coupled to the HMD, to produce the image frames.

28. The system of claim 27, wherein the computer is integrated in the HMD.

29. The system of claim 27, wherein the computer is a separate computing device that is communicatively coupled to the HMD through a wired or wireless connection.

* * * * *